US006979046B2

(12) United States Patent
Moriyama et al.

(10) Patent No.: US 6,979,046 B2
(45) Date of Patent: Dec. 27, 2005

(54) SIDE DOOR STRUCTURE OF VEHICLE AND METHOD OF DESIGNING THE SIDE DOOR STRUCTURE

(75) Inventors: Yukihiro Moriyama, Hiroshima (JP); Minoru Matsui, Hiroshima (JP); Naoki Yamada, Hiroshima (JP); Hironobu Yonezawa, Hiroshima (JP); Seishi Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 97 days.

(21) Appl. No.: 10/701,169

(22) Filed: Nov. 5, 2003

(65) Prior Publication Data

US 2005/0156451 A1 Jul. 21, 2005

(30) Foreign Application Priority Data

Nov. 5, 2002 (JP) ............................ 2002-321631
Nov. 5, 2002 (JP) ............................ 2002-321655
Nov. 7, 2002 (JP) ............................ 2002-324231

(51) Int. Cl.[7] ................................................ B60J 5/00

(52) U.S. Cl. ........................ 296/146.11; 16/366; 16/82

(58) Field of Search ........................ 296/146.11, 146.6, 296/187.12, 146.9, 146.1, 146.4, 202, 209, 296/146.8, 152; 49/425, 383; 312/319.2, 312/321.5, 405; 16/221, 235, 249, 86 R, 16/86 A, 86 B, 86 C

(56) References Cited

U.S. PATENT DOCUMENTS 2,116,330 A * 5/1938 Tjaarda ...................... 296/202
4,930,836 A * 6/1990 Grinn .................... 296/146.11
5,444,894 A * 8/1995 Heiler ......................... 16/262
5,613,755 A * 3/1997 Gold .......................... 362/501
5,752,737 A * 5/1998 Heldt et al. .............. 296/146.6
6,178,594 B1 * 1/2001 Koch .......................... 16/374
6,237,190 B1 * 5/2001 Grumm et al. ................ 16/82
6,694,676 B2 * 2/2004 Sakamoto et al. ............ 49/366
6,728,993 B1 * 5/2004 Murayama ............. 296/146.11
6,779,831 B2 * 8/2004 Moriyama ............. 296/146.11
6,813,811 B2 * 11/2004 Matsuki et al. ............. 16/86 B
6,817,065 B1 * 11/2004 Bruckner ..................... 16/366
6,842,943 B2 * 1/2005 Hoffmann et al. ............. 16/82
6,877,796 B2 * 4/2005 Kimura ................. 296/187.13
2004/0088823 A1 5/2004 Moriyama

FOREIGN PATENT DOCUMENTS

EP 1 418 075 6/2004
JP 2001-138864 5/2001
JP 2004/130962 4/2004

* cited by examiner

*Primary Examiner*—Kiran B. Patel
(74) *Attorney, Agent, or Firm*—Nixon Peabody LLP; Donald R. Studebaker

(57) ABSTRACT

A two-way opening side door structure of a vehicle of which side openings are covered by a front door and a rear door includes a door hinge located at a front end of the front door for swingably supporting the front door, a door hinge located at a rear end of the rear door for swingably supporting the rear door, and an assisting device including a door checker for assisting a vehicle occupant in closing the rear door.

11 Claims, 17 Drawing Sheets

SIDE DOOR STRUCTURE OF VEHICLE AND METHOD OF DESIGNING THE SIDE DOOR STRUCTURE

BACKGROUND OF THE INVENTION

1. Field of the Invention

The present invention relates to a side door structure and a method of designing the side door structure applicable to a vehicle body of which side openings are covered by front doors swingably supported by door hinges located at the front of the front doors and by rear doors swingably supported by door hinges located at the rear of the rear doors.

2. Description of the Related Art

There exists a conventionally known side door structure of a vehicle of which front doors and rear doors covering side openings in a vehicle body are opened frontward and rearward, respectively, as described in Japanese Unexamined Patent Publication No. 2001-138864, for example. In this side door structure (hereinafter referred to as the two-way opening side door structure), the front doors are swingably supported by door hinges located at the front of the front doors and the rear doors are swingably supported by door hinges located at the rear of the rear doors so that they can be opened frontward and rearward, respectively.

The prior art to which the invention is directed also discloses a door checker interconnecting a vehicle body and a door for controlling door swinging torque and for holding the door at a specific opening angle. This kind of door checker disclosed in Japanese Unexamined Patent Publication No. 2001-138864, for instance, includes a checker plate affixed to the vehicle body or the door, and is located between upper and lower door hinges which serve as a supporting point of the swinging door.

The two-way opening side door structure of the vehicle disclosed in the above-cited Japanese Unexamined Patent Publication No. 2001-138864 is built as follows. When opening a rear door 4*a,* an occupant first undoes a door lock of a front door 2*a* and opens the front door 2*a* to a specific angle as shown by imaginary lines in FIG. 20 to release the front and rear doors 2*a,* 4*a* from their interlocked state. Then, the occupant swings the rear door 4*a* from a closed position to an open position.

Generally, upper portions of side doors (front and rear) of the vehicle are inwardly inclined as viewed from the front of the vehicle so that upper ends of the side doors are located more or less inward toward a center line of the vehicle body largely for design-related reasons. When the front and rear doors 2*a,* 4*a* of which upper portions are inwardly inclined are swingably supported by vertically mounted hinge pins 17*a* and 12*a,* respectively, as shown in FIG. 21, a rearmost part of the upper end of the front door 2*a* swings slightly rearward whereas a forwardmost part of the upper end of the rear door 4*a* swings slightly frontward in an initial stage of opening the respective doors 2*a,* 4*a*. This is because the upper ends of the front and rear doors 2*a,* 4*a* are positioned inward toward the center line of the vehicle body with respect to longitudinal axes of the hinge pins 17*a,* 12*a*.

In addition, the front and rear doors 2*a,* 4*a* are installed in such a manner that a rear end of the front door 2*a* and a front end of the rear door 4*a* overlap each other by a specific distance OL. Therefore, a swing trajectory of the rear end of the front door 2*a* and a swing trajectory of the front end of the rear door 4*a* produced as the respective doors 2*a,* 4*a* are opened and closed inevitably overlap over a large area "A" as illustrated (hatched in FIG. 21).

In this structure, the front end of the rear door 4*a* is apt to interfere with the rear end of the front door 2*a* when the rear door 4*a* is opened and, therefore, the occupant has to open the rear door 4*a* after widely opening the front door 2*a* to prevent this interference between the front and rear doors 2*a,* 4*a*. The conventional two-way opening side door structure has this problem concerning operational ease.

One approach to the prevention of the interference between the front and rear doors 2*a,* 4*a* which could be caused by the large overlapping area "A" of their swing trajectories would be to tilt the hinge pins 17*a,* 12*a* of the front and rear doors 2*a,* 4*a* by an amount corresponding to the inclination of their upper portions. If the hinge pins 17*a,* 12*a* are so inclined, however, there arises a problem that a large force would be needed for opening the doors 2*a,* 4*a* from their closed positions. FIG. 21 shows a state of the front and rear doors 2*a,* 4*a* as viewed along an axial direction of the hinge pins 17*a,* 12*a* which are inclined such that upper ends of the hinge pins 17*a,* 12*a* are inwardly offset.

A comparison between FIGS. 20 and 21 indicates that the overlapping area "A" of the swing trajectories of the front and rear doors 2*a,* 4*a* produced as the doors 2*a,* 4*a* are swung about the respective hinge pins 17*a,* 12*a* can be reduced by tilting the hinge pins 17*a,* 12*a* by the amount corresponding to the inclination of the upper portions of the respective doors 2*a,* 4*a*. If the hinge pins 17*a,* 12*a* are inclined such that their upper ends are inwardly offset as mentioned above, however, large moments of force act on the front and rear doors 2*a,* 4*a* in their closing direction, wherein the moment of force (resisting moment) acting on each door 2*a,* 4*a* is given as the product of the weight M of each door 2*a,* 4*a* acting vertically downward through its center of gravity O and a distance L1, L2 from the center of gravity O to the hinge pin 17*a,* 12*a*. One problem of this approach (tilting of the hinge pins 17*a,* 12*a*) is that a large force is needed in an initial stage of opening the individual doors 2*a,* 4*a,* because the occupant has to open the doors 2*a,* 4*a* against the large moments of force.

Another problem of the aforementioned conventional approach is that, because the resisting moment works on the front and rear doors 2*a,* 4*a* until they reach an opening angle θ of approximately 90 degrees, specific amounts of force are needed up to a final stage of opening the two doors 2*a,* 4*a* and it is difficult to hold the individual doors 2*a,* 4*a* at their fully open positions.

Although it would be preferable to hold the rear door 4*a* at an opening angle convenient for a rear seat occupant to get into and out of the vehicle by means of a door checker as disclosed in the aforementioned Japanese Unexamined Patent Publication No. 2001-138864, for example, it is necessary to use a door checker capable of exerting a considerable restraining force for retaining the rear door 4*a* at such an opening angle in a stable fashion. It is however difficult to ensure a space for installing this kind of door checker, and such a door checker imposes significant limitations on the degree of freedom in component layout.

SUMMARY OF THE INVENTION

This invention is intended to solve the aforementioned problems of the conventional side door structure. Accordingly, it is an object of the invention to provide a two-way opening side door structure of a vehicle and a method of designing the two-way opening side door structure capable of holding front and rear side doors with increased operational ease while effectively avoiding interference between the front and rear side doors.

In one form of the invention, a side door structure of a vehicle of which side openings are covered by a front door and a rear door includes a door hinge located at a front end of the front door for swingably supporting the front door and a door hinge located at a rear end of the rear door for swingably supporting the rear door. In this side door structure, the door hinge for the rear door includes a hinge pin which is inclined such that its upper end is located inward toward a center line of a vehicle body as viewed from the front of the vehicle and toward the rear of the vehicle body as viewed from the side of the vehicle.

Since the hinge pin of the door hinge for the rear door is inclined such that its upper end is located inward toward the center line of the vehicle body in this side door structure, the amount of frontward shift of the front end of the rear door occurring when the rear door is opened is reduced. This helps prevent interference between the front and rear doors. In addition, a swinging force needed in opening the rear door about the hinge pin is reduced as the hinge pin is inclined such that its upper end is located toward the rear of the vehicle body in this side door structure. Also, since the hinge pin of the door hinge for the rear door is inclined as stated above, it is possible to open and close the rear door with increased operational ease while effectively avoiding interference between the front and rear side doors in this two-way opening side door structure.

These and other objects, features and advantages of the invention will become more apparent upon reading the following detailed description along with the accompanying drawings.

DETAILED DESCRIPTION OF THE PREFERRED EMBODIMENTS OF THE INVENTION

Specific embodiments of the invention are now described in detail with reference to the appended drawings. While the following discussion illustrates preferred modes of carrying out the invention, by way of example, it is to be noted that the invention is not limited thereto.

Figure 1:
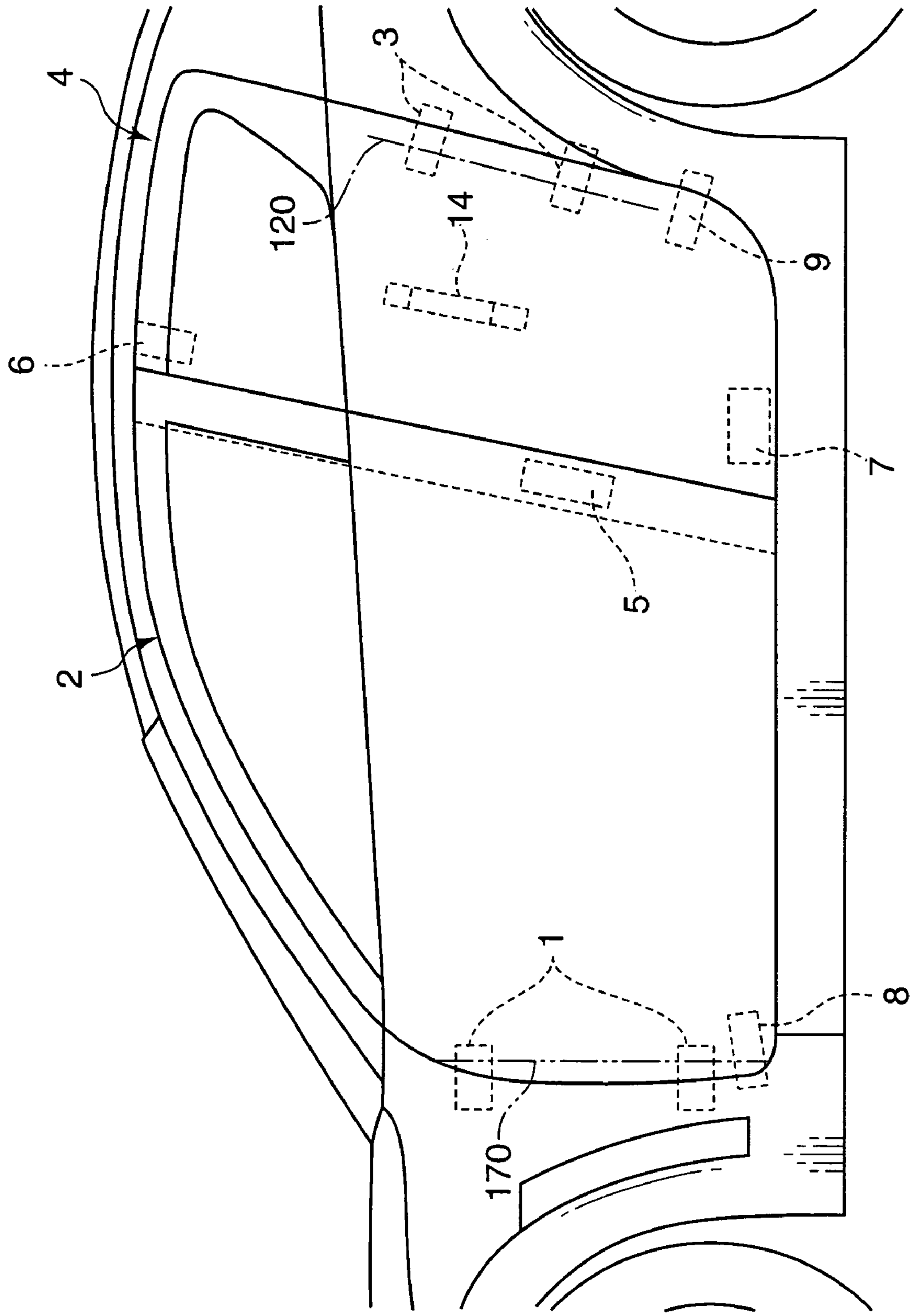
FIG. 1 is a side view showing a side door structure of a vehicle according to a preferred embodiment of the invention.
Figure 2:
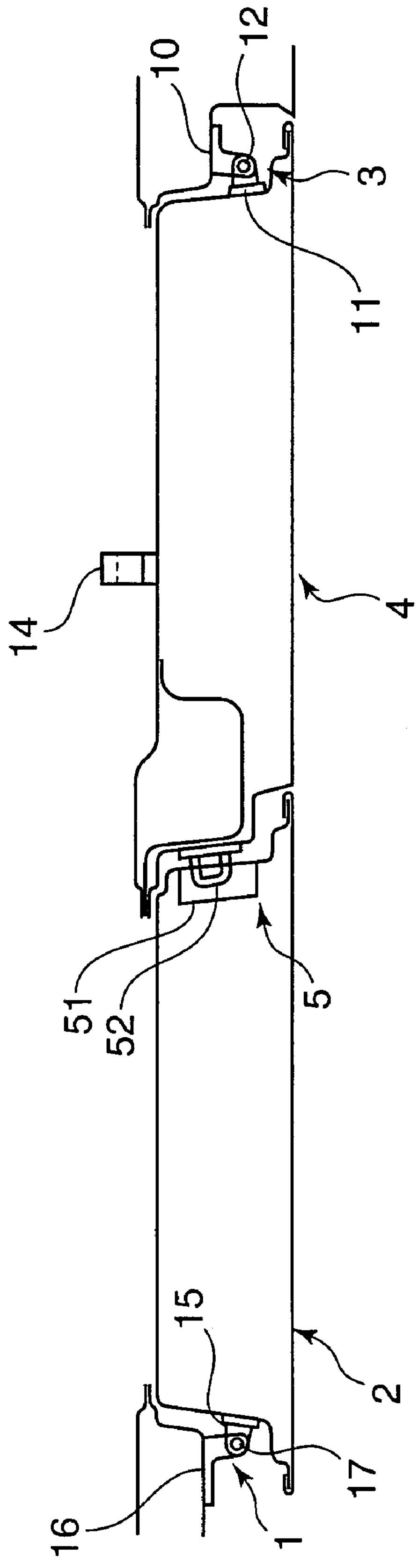
FIG. 2 is a plan view showing the side door structure of FIG. 1.

FIGS. 1 and 2 are diagrams showing a side door structure of a vehicle according to a preferred embodiment of the invention. The side door structure includes left and right front doors 2 each supported by a pair of upper and lower door hinges 1 located at their front ends and left and right rear doors 4 each supported by a pair of upper and lower door hinges 3 located at their rear ends. The front and rear doors 2, 4 covering front and rear openings formed in both side walls of a vehicle body can be swung about the respective door hinges 1, 3 between their closed and open positions. More specifically, the side door structure of the embodiment is a two-way opening side door structure in which the front doors 2 are opened frontward and the rear doors 4 are opened rearward.

The front door 2 on each side of the vehicle is retained at the closed position as it is interlocked with the rear door 4 by a door lock 5 which includes a door latch 51 provided at a rear end of the front door 2 and a striker 52 provided at a front end of the rear door 4. On the other hand, the rear door 4 on each side of the vehicle is retained at the closed position by a pair of upper and lower door locks 6, 7 provided between the rear door 4 and the vehicle body. There is provided a door checker 8 at a lower front position of the front door 2 for holding the front door 2 at a fixed position when it has reached a specific opening angle. Likewise, there is provided a door checker 9 at a lower rear position of the rear door 4 for holding the rear door 4 at a fixed position when it has reached a specific opening angle.

Figure 3:
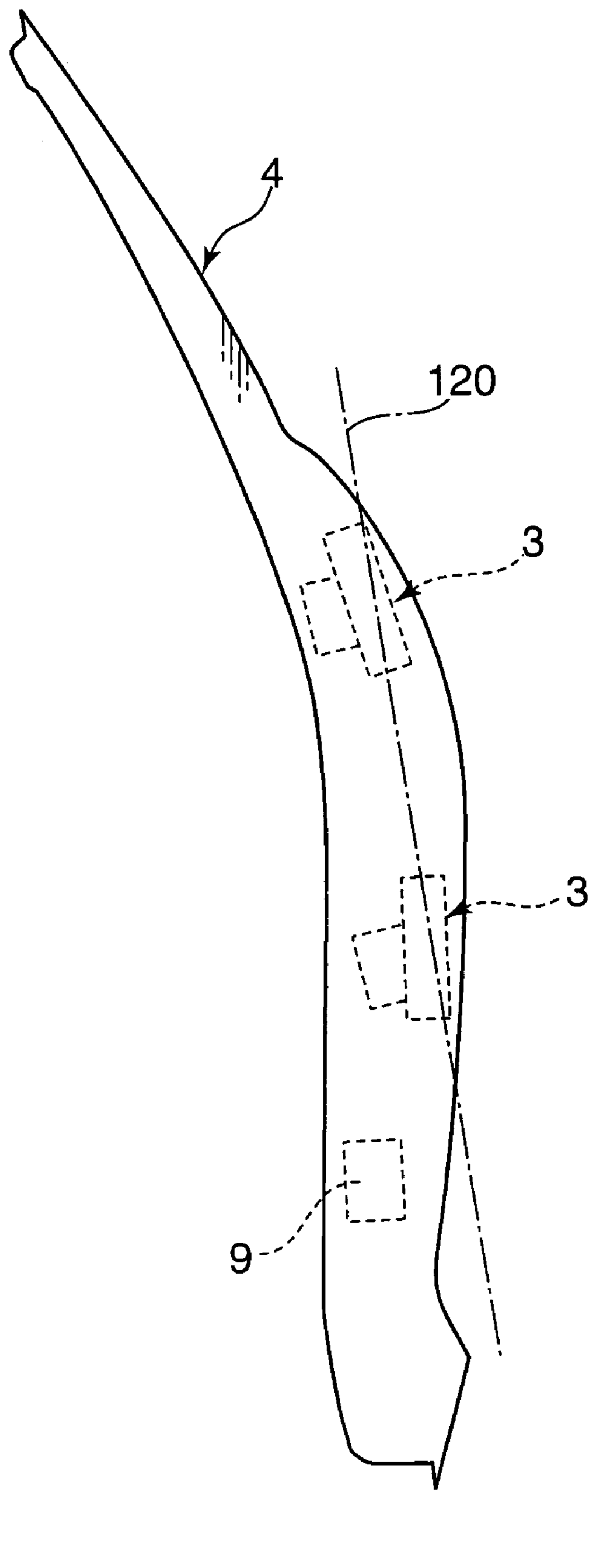
FIG. 3 is an explanatory diagram showing how a rear door is supported as viewed from the front of the vehicle.

The door hinges 3 supporting the rear door 4 each include a metallic hinge leaf 10 affixed to a rear wall surface of the rear door 4, a metallic hinge leaf 11 affixed to a rear side of a peripheral surface of the rear opening formed in the vehicle body, and a hinge pin 12 joining the hinge leaves 10, 11. A vehicle occupant can open and close the rear door 4 while holding an inner door handle 14 located a specific distance rearward from the front end of the rear door 4. The rear door 4 swings between its closed and open positions about the hinge pins 12 of the upper and lower door hinges 3. The upper and lower door hinges 3 are mounted in such a way that an axis line 120 of each hinge pin 12 is inclined sideways as viewed from the front of the vehicle so that an upper end of each hinge pin 12 is located slightly inward toward a center line of the vehicle body as shown in FIG. 3 and the axis line 120 of each hinge pin 12 is inclined so that the upper end of each hinge pin 12 is located slightly toward the rear of the vehicle body in side view as shown in FIG. 1.

Likewise, the door hinges 1 supporting the front door 2 each include a metallic hinge leaf 15 affixed to a front wall surface of the front door 2, a metallic hinge leaf 16 affixed to a frontal part of a peripheral surface of the front opening formed in the vehicle body, and a hinge pin 17 joining the hinge leaves 15, 16. The front door 2 swings between its closed and open positions about the hinge pins 17 of the upper and lower door hinges 1. Like the door hinges 3 of the rear door 4, the upper and lower door hinges 1 supporting the front door 2 are mounted in such a way that an axis line 170 of each hinge pin 17 is inclined sideways as viewed from the front of the vehicle so that an upper end of each hinge pin 17 is located slightly inward toward the center line of the vehicle body and the axis line 170 of each hinge pin 17 is oriented generally vertically in side view as shown in FIG. 1.

Figure 4:
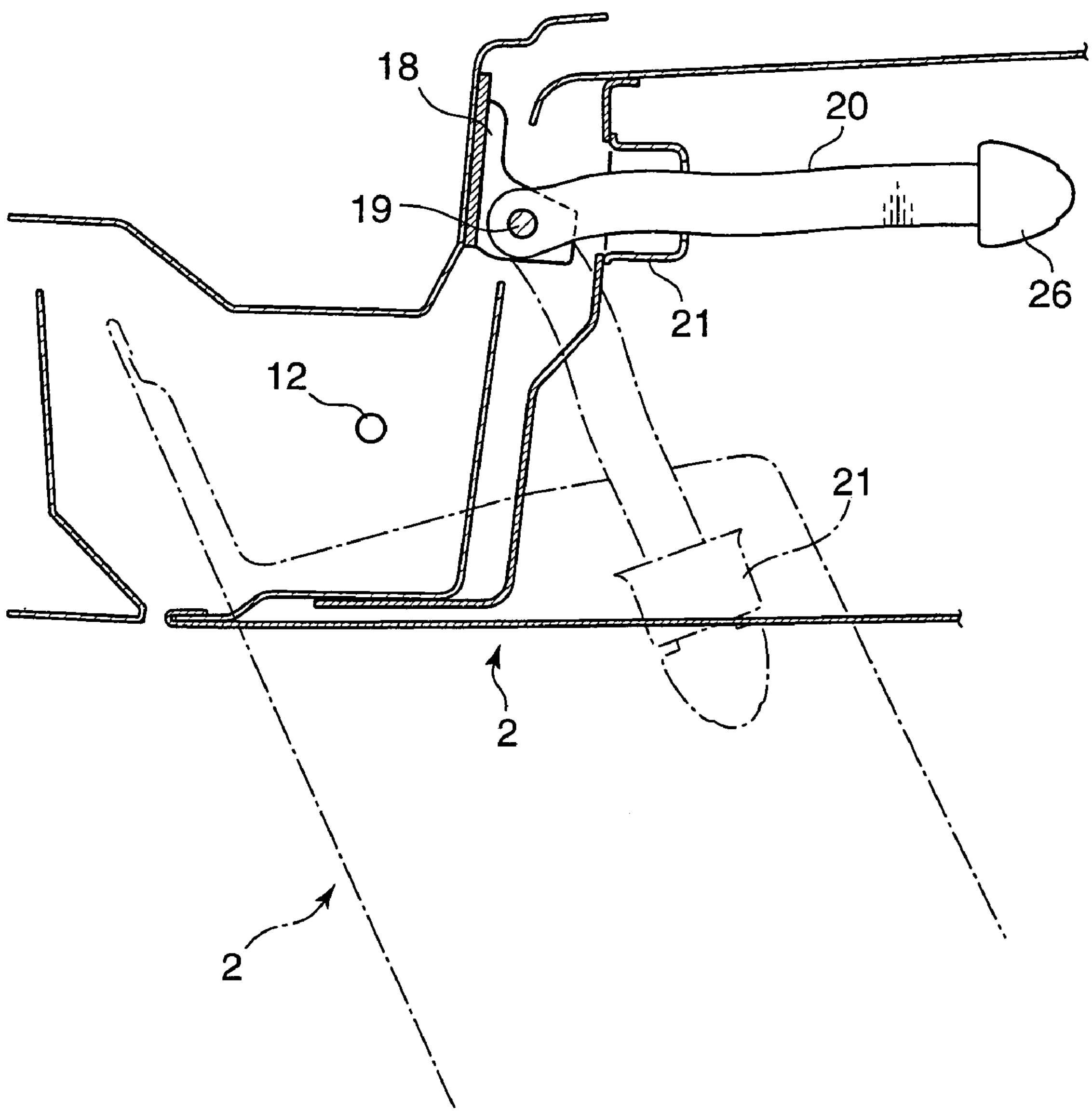
FIG. 4 is a sectional plan view showing a specific construction of a door checker for a front door.
Figure 5:
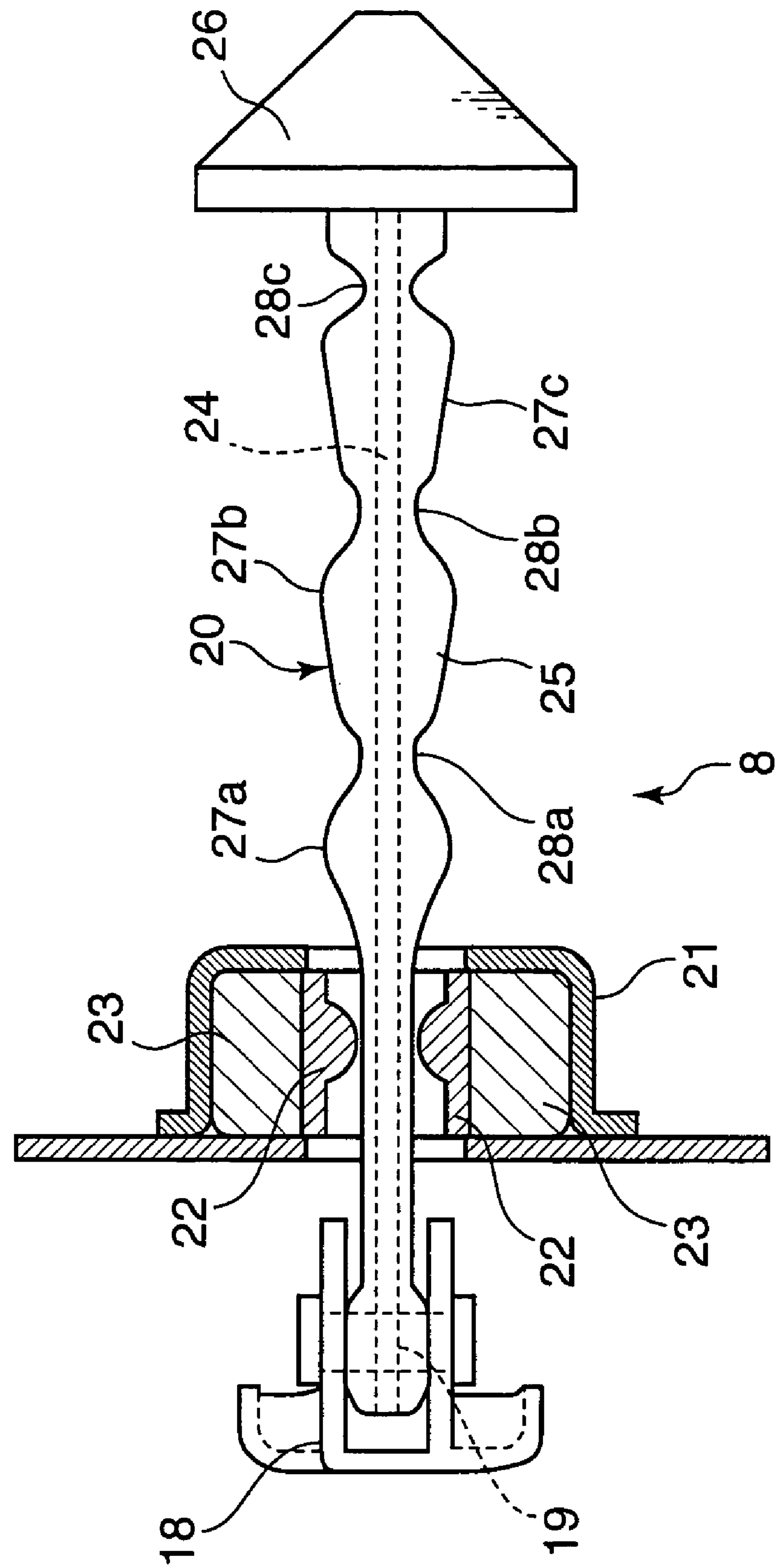
FIG. 5 is a sectional side view showing the construction of the door checker for the front door.

The door checker 8 for the front door 2 includes a bracket 18 attached to the vehicle body at a position facing the front wall surface of the front door 2, a checker plate 20 supported swingably about a support pin 19 fitted in the bracket 18, and a boxlike holder 21 affixed inside a frontal part of the front door 2 as shown in FIG. 4. The holder 21 contains a pair of upper and lower clamping parts 22 and a pair of elastic members 23 forcing the upper and lower clamping parts 22 toward each other as shown in FIG. 5.

The checker plate 20 has a core 24 made of a steel plate, for example, a sheathing 25 made of synthetic resin covering the core 24 and a stopper 26 provided at an extreme end of the checker plate 20. When the checker plate 20 is set in position through a hole in the holder 21 as illustrated, the upper and lower clamping parts 22 grasp the checker plate 20 from both top and bottom sides of the checker plate 20 due to biasing forces exerted by the elastic members 23. The thickness of the checker plate 20 is varied along a longitudinal direction of the checker plate 20 so that there are formed alternate protruding parts (protuberances) 27*a*, 27*b*, 27*c* and narrowed parts (recesses) 28*a*, 28*b*, 28*c* on the top and bottom sides of checker plate 20.

As the occupant opens or closes the front door 2, the holder 21 slides along the length of the checker plate 20. In the door checker 8 constructed as described above, the amount of friction of sliding exerted by the upper and lower clamping parts 22 on top and bottom surfaces of the checker plate 20 due to the biasing forces of the elastic members 23 varies with the opening angle of the front door 2.

The support pin 19 of the door checker 8 is located at a position offset inward toward the center line of the vehicle body by a specific distance from the location of the hinge pin 17 as shown in the plan view of FIG. 4. Therefore, as the occupant swings the front door 2 about the hinge pins 17 from the closed position shown by solid lines in FIG. 4 to the open position shown by dot-and-dash lines, and vice versa, the holder 21 moves together with the front door 2 and the checker plate 20 swings about the support pin 19 as shown by solid and dot-and-dash lines. Since a supporting point (or an axis line of the support pin 19) about which the checker plate 20 swings is offset from a supporting point (or an axis line of the hinge pin 17) about which the front door 2 swings as described above, the holder 21 shifts sliding along the length of the checker plate 20 when the occupant swings the front door 2.

When the holder 21 slides along the checker plate 20, the upper and lower clamping parts 22 contained in the holder 21 slide over the protuberances 27*a*, 27*b*, 27*c* toward the successive recesses 28*a*, 28*b*, 28*c* formed on the top and bottom surfaces of the checker plate 20. During this sliding process, sloping surfaces of the individual recesses 28*a*, 28*b*, 28*c* force the upper and lower clamping parts 22 upward and downward, compressing the upper and lower elastic members 23, respectively. Consequently, there occurs friction of sliding corresponding to the biasing forces exerted by the elastic members 23. The biasing forces of the elastic members 23 act in directions in which the upper and lower clamping parts 22 are caused to drop into the individual recesses 28*a*, 28*b*, 28*c*. Thus, when the clamping parts 22 have dropped into any pair of these recesses 28*a*, 28*b*, 28*c* and the front door 2 is not pushed further outward in its opening action, the upper and lower clamping parts 22 pushed by the elastic members 23 exert a particular restraining force on the checker plate 20, so that the front door 2 is kept at an opening angle corresponding to which recesses 28*a*, 28*b*, 28*c* the clamping parts 22 have dropped in.

Figure 6:
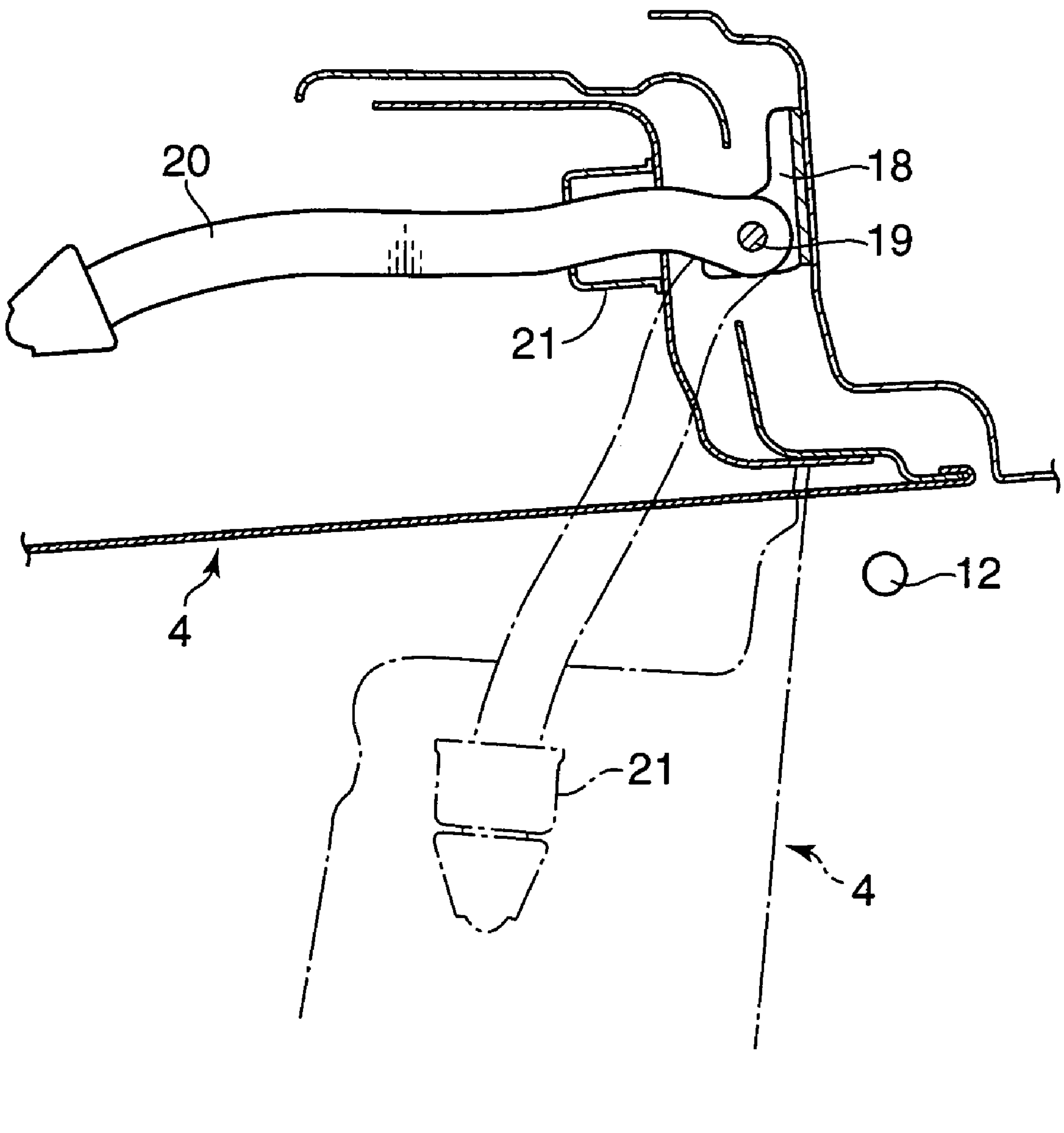
FIG. 6 is a sectional plan view showing a specific construction of a door checker for the rear door.
Figure 7:
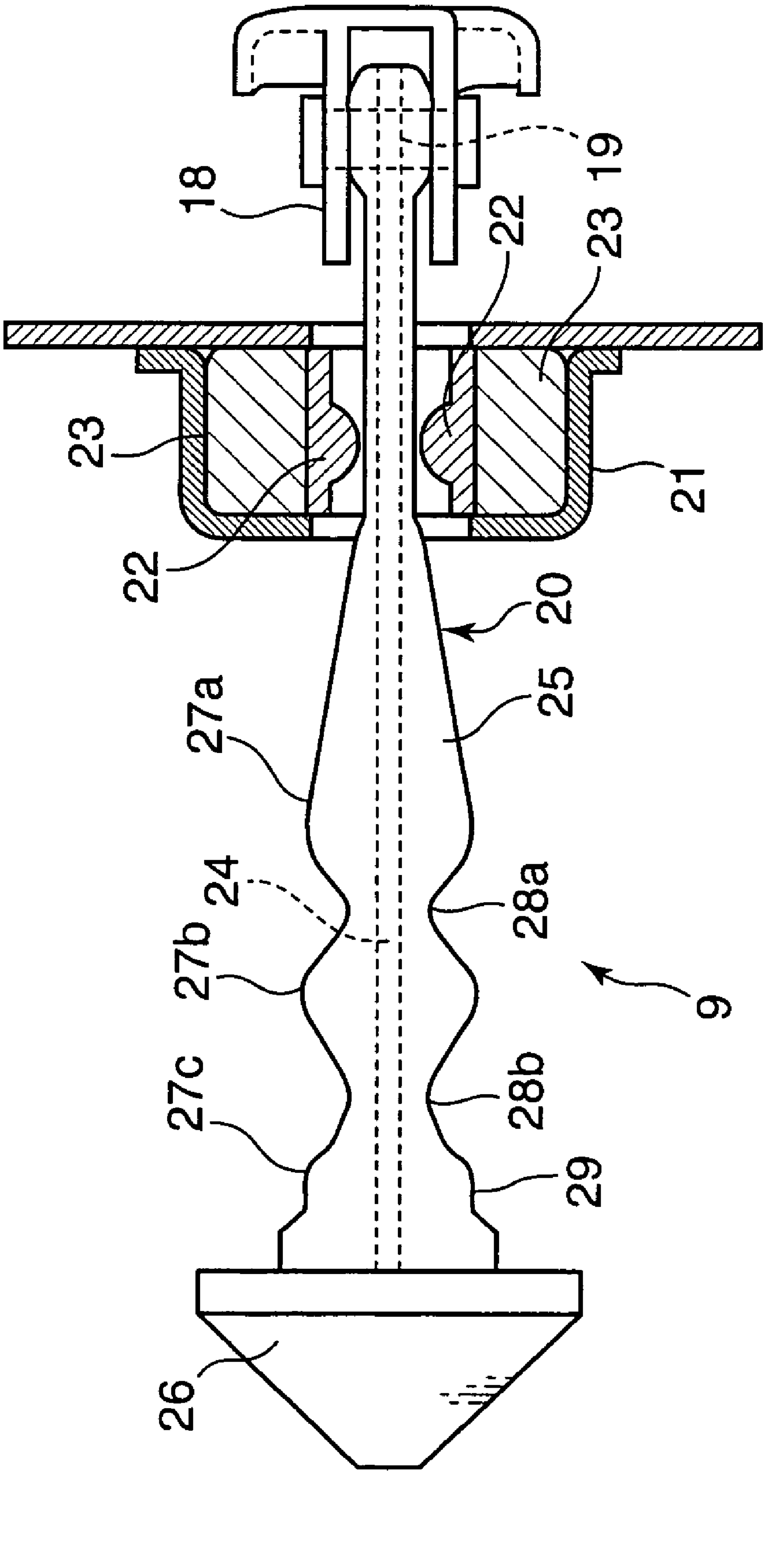
FIG. 7 is a sectional side view showing the construction of the door checker for the rear door.

Likewise, the door checker 9 for the rear door 4 includes a bracket 18 attached to the vehicle body at a position facing the rear wall surface of the rear door 4, a checker plate 20 supported swingably about a support pin 19 fitted in the bracket 18, and a boxlike holder 21 affixed inside a rear part of the rear door 4 as shown in FIG. 6. The holder 21 contains a pair of upper and lower clamping parts 22 and a pair of elastic members 23 forcing the upper and lower clamping parts 22 toward each other as shown in FIG. 7.

The checker plate 20 of the door checker 9 for the rear door 4 differs from the checker plate 20 of the door checker 8 for the front door 2 mainly in that a pair of protuberances 27*c* (upper and lower) formed close to an extreme end of the checker plate 20 widens toward a stopper 26 forming a large-diameter portion 29 at a terminal part of the checker plate 20 without forming any recesses 28*c*. The checker plate 20 of the door checker 9 for the rear door 4 is otherwise constructed generally in the same fashion as the checker plate 20 of the door checker 8 for the front door 2. Also, the door checker 9 for the rear door 4 functions in a similar way as the door checker 8 for the front door 2.

If an occupant on a rear seat intends to open the rear door 4 from its closed position, the occupant first undoes the door lock 5 to unlock the front door 2 and opens the front door 2 to a specific angle. Then, after releasing the upper and lower door locks 6, 7 of the rear door 4, the occupant opens the rear door 4 while holding the inner door handle 14 such that the front end of the rear door 4 swings outward from the vehicle body. When the front and rear doors 2, 4 reach specific opening angles as they are being opened, the doors 2, 4 are held at the respective opening angles by restraining forces exerted by the door checkers 8, 9 on the respective doors 2, 4.

Figure 8:
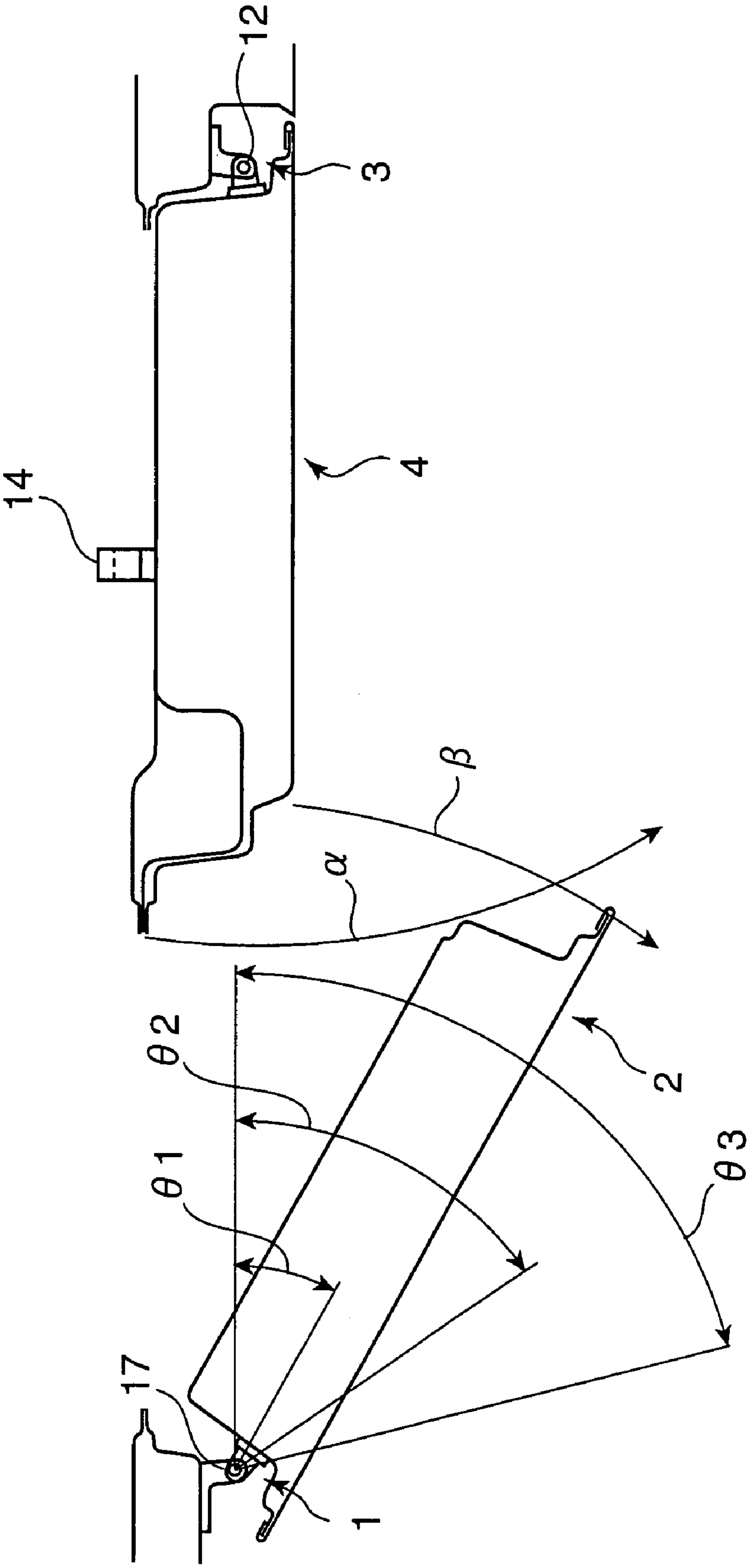
FIG. 8 is an explanatory diagram showing how the front door swings as it is opened and closed.

More specifically, the door checker 8 for the front door 2 is constructed such that, when the front door 2 reaches a position of its minimum opening angle $\theta 1$ located slightly on the outside of a swing trajectory $\alpha$ of the front end of the rear door 4, the clamping parts 22 of the door checker 8 reach the location of the first recesses 28*a* (among the first to third recesses 28*a*, 28*b*, 28*c*) formed on the checker plate 20 of the door checker 8 closest to the support pin 19, whereby the front door 2 is held at the minimum opening angle $\theta 1$ as shown in FIG. 8. When the front door 2 is further opened and the clamping parts 22 reach the location of the second recesses 28*b* situated at about the middle of the length of the checker plate 20, the front door 2 is held at its medium opening angle $\theta 2$ which is convenient for a front seat occupant to get into and out of the vehicle. Then, when the front door 2 is further opened and the clamping parts 22 reach the location of the third recesses 28*c* situated near the extreme end of the checker plate 20, the front door 2 is held at its maximum opening angle θ3.

On the other hand, the door checker 9 for the rear door 4 is constructed such that, when the rear door 4 reaches a position of its minimum opening angle located slightly on the outside of a swing trajectory β of the rear end of the front door 2, the clamping parts 22 of the door checker 9 reach the location of the first recesses 28*a* formed on the checker plate 20 of the door checker 9 closest to the support pin 19, whereby the rear door 4 is held at the minimum opening angle. When the rear door 4 is further opened and the clamping parts 22 reach the location of the second recesses 28*b* formed on the checker plate 20, the rear door 4 is held at its medium opening angle which is convenient for a rear seat occupant to get into and out of the vehicle. Then, when the rear door 4 is further opened and the clamping parts 22 reach the location of the large-diameter portion 29 situated near the extreme end of the checker plate 20, the rear door 4 is held at its maximum opening angle.

Figure 9:
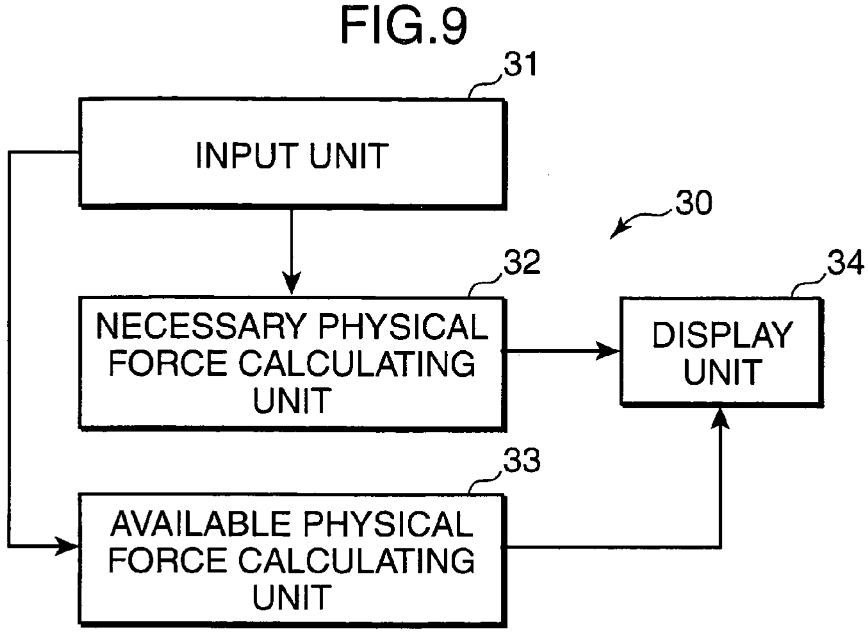
FIG. 9 is a schematic block diagram showing the configuration of a design system used for designing the side door structure of the vehicle.

FIG. 9 is a schematic block diagram showing the configuration of a design system 30 used for designing the aforementioned side door structure of the vehicle. The design system 30 includes an input unit 31 used for inputting design data, such as data on mechanical characteristics of the front and rear doors 2, 4 and physical forces that an ordinary vehicle occupant can exert when opening and closing the individual doors 2, 4 obtained in a predesign stage, a necessary physical force calculating unit 32 for calculating physical forces expected to be necessary for opening and closing the individual doors 2, 4 based on their mechanical characteristics data, an available physical force calculating unit 33 for calculating physical forces that the ordinary vehicle occupant can exert when opening and closing the individual doors 2, 4, and a display unit 34 including a monitor for displaying information such as the physical forces calculated by the necessary physical force calculating unit 32 and the available physical force calculating unit 33.

A method of designing the side door structure of the vehicle by using the design system 30 is now described. First, an operator inputs mechanical characteristics data on the rear door 4 including the weight of the rear door 4 predesigned in a specified shape using generally used material, the locations and mounting angle of the door hinges 3 and the location of the inner door handle 14, as well as physical properties of a typical rear seat occupant including joint motion properties and dynamic muscle motion properties. The operator analyzes such input data and judges whether the location of the inner door handle 14 is appropriate with the aid of the design system 30.

Figure 10:
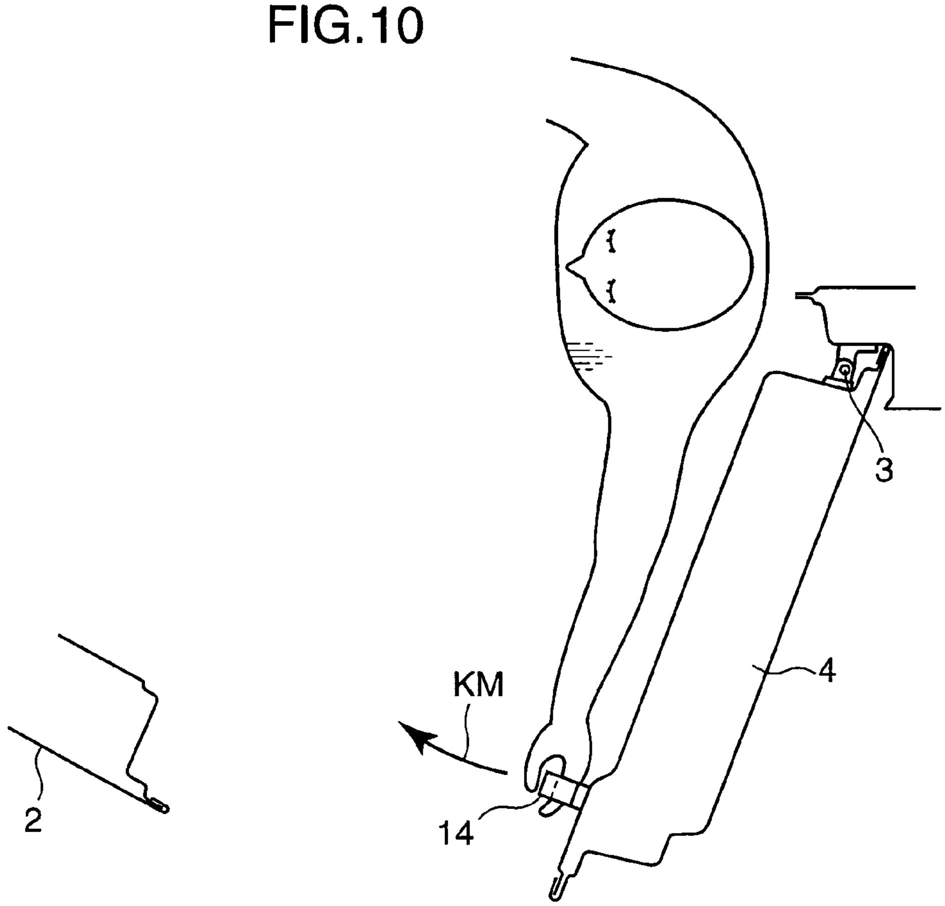
FIG. 10 is an explanatory diagram showing a state in which the rear door is opened while holding an inner door handle located near a front end of the rear door.

More specifically, the design system 30 calculates necessary physical forces for exerting a large swinging moment KM on the rear door 4 while holding the inner door handle 14 in an initial design stage in which the inner door handle 14 is assumed to be installed close to the front end of the rear door 4 as shown in FIG. 10, determines the occupant's body position and available physical forces for exerting the necessary physical forces, and displays these data on the display unit 34. The operator analyzes the displayed data and judges whether the displayed data are appropriate.

Figure 11:
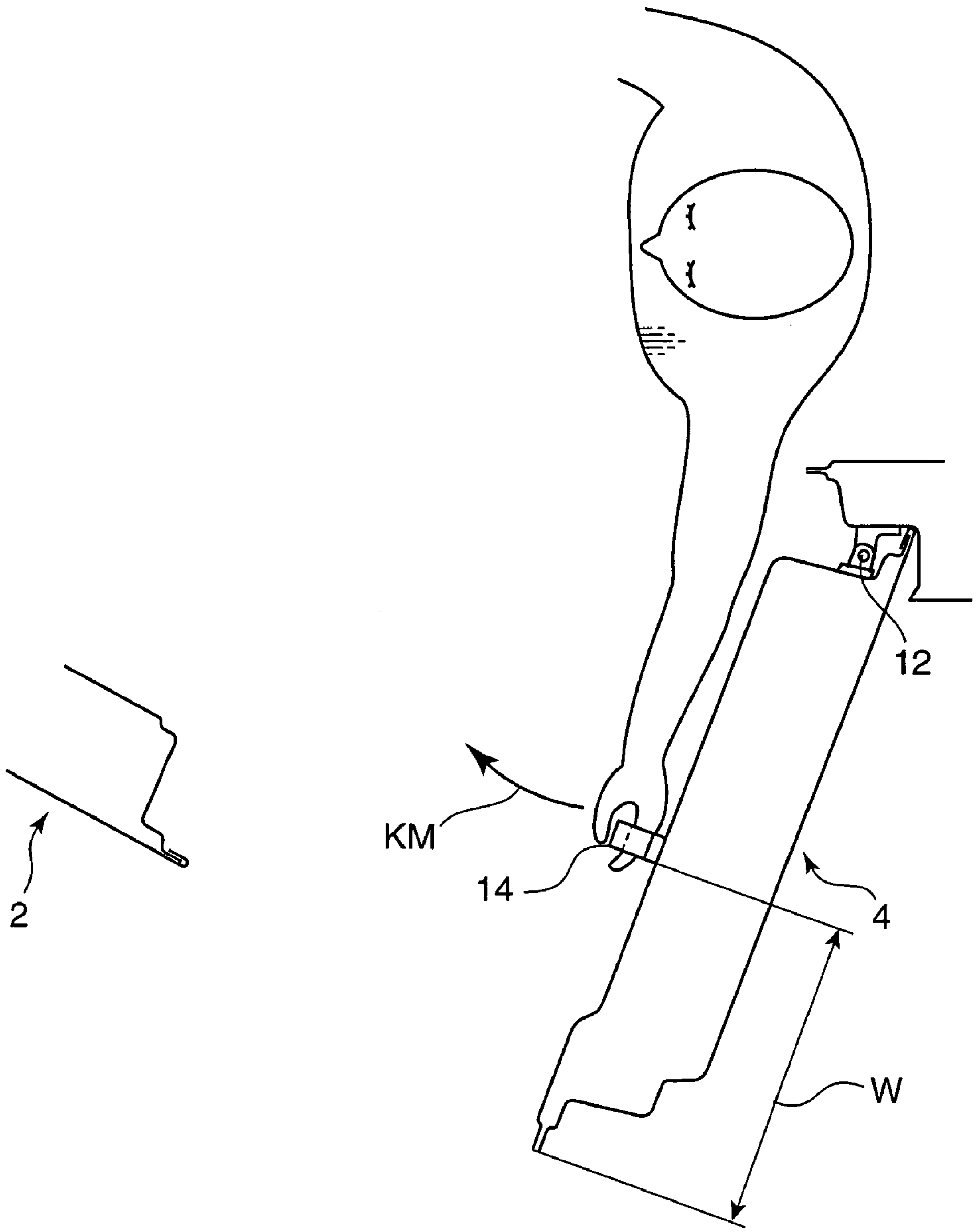
FIG. 11 is an explanatory diagram showing a state in which the rear door is opened while holding an inner door handle located a specific distance toward the rear of the vehicle from the front end of the rear door.

It will be ascertained through analysis of the displayed data that the rear seat occupant is forced to assume a painstaking body position, stretching his or her body and arm outward to the inner door handle 14, for closing the rear door 4 from its fully open position as shown in FIG. 10. Under this circumstance, the operator obtains data on the occupant's body position and available physical forces for a case in which the inner door handle 14 is located a specific distance toward the rear of the vehicle body from the front end of the rear door 4 as shown in FIG. 11 with the aid of the design system 30 and displays these data on the display unit 34. An analysis of these data will indicate that the occupant can close the rear door 4 in a natural posture if the inner door handle 14 is located a specific distance toward the rear of the vehicle body from the front end of the rear door 4 in this fashion.

After determining an appropriate mounting position of the inner door handle 14 in the aforementioned manner, the operator determines the physical force necessary for closing the rear door 4 from its open position based on such parameters as the hinge locations and the weight of the rear door 4 obtained in the initial design stage with the aid of the design system 30, of which display unit 34 presents the necessary physical force thus obtained. When the hinge pins 12 of the door hinges 3 of the rear door 4 are inclined in such a way that the upper end of each hinge pin 12 is located slightly inward toward the center line of the vehicle body in front view as shown in FIG. 3 and slightly toward the rear of the vehicle body in side view as shown in FIG. 1, for example, the necessary physical force for closing the rear door 4 from its open position is calculated as shown by a dot-and-dash line B1 in FIG. 12. On the other hand, the available physical force that the rear seat occupant can produce when closing the rear door 4 from its fully open position to fully closed position while holding the inner door handle 14 is calculated as shown by a curve in FIG. 13.

Figure 12:
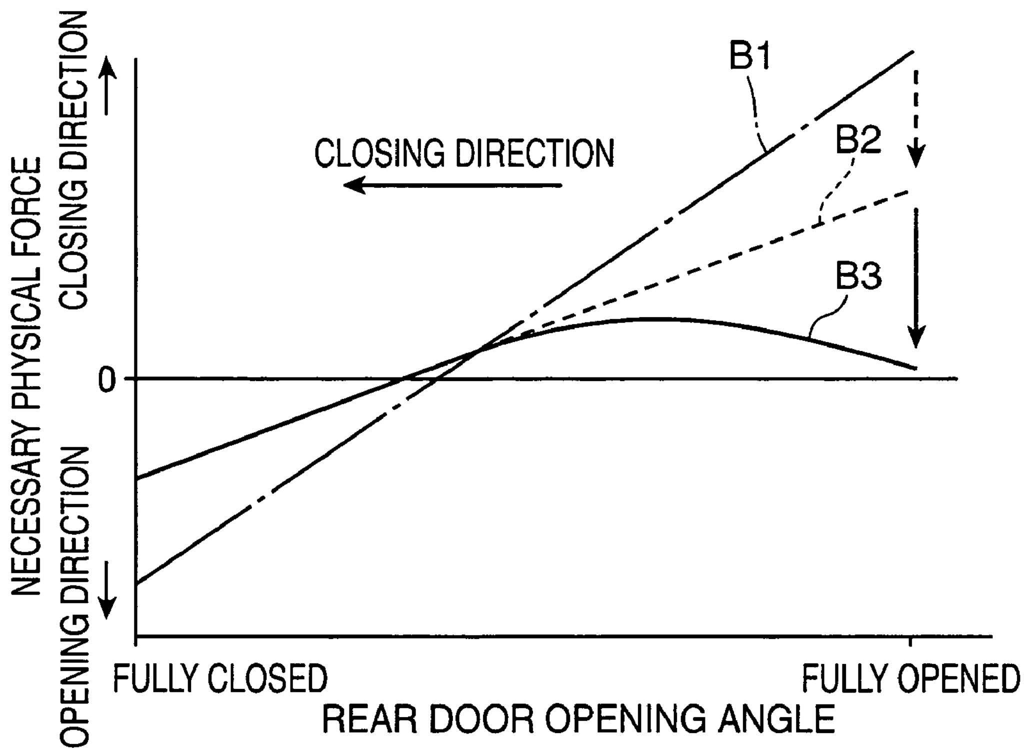
FIG. 12 is a graph showing necessary physical forces for closing the rear door.
Figure 13:
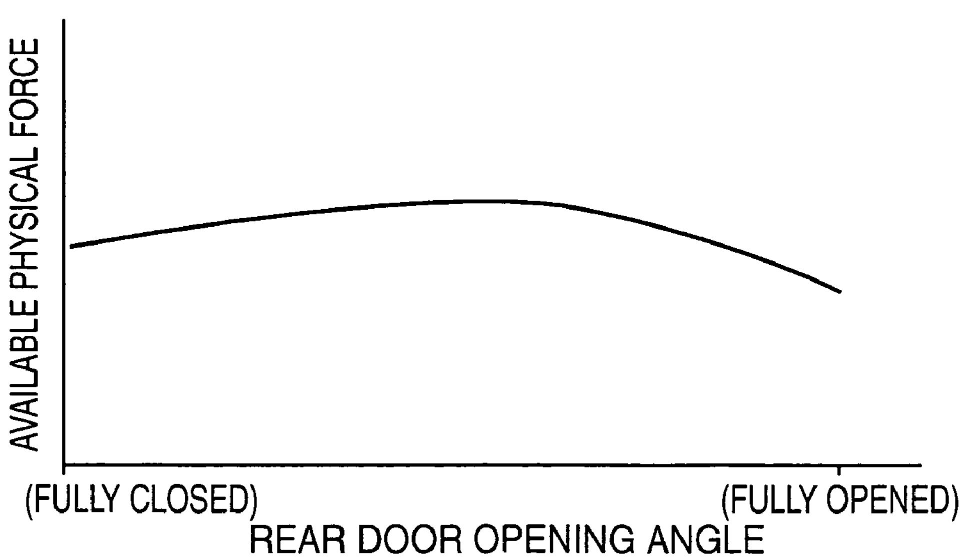
FIG. 13 is a graph showing available physical forces for closing the rear door.

A comparison between the dot-and-dash line B1 of FIG. 12 and the curve of FIG. 13 indicates that the available physical force of the rear seat occupant for closing the rear door 4 is significantly short of the necessary physical force derived from the mechanical characteristics of the rear door 4 in an early half stage of closing the rear door 4. If the rear door 4 is redesigned to reduce its weight, the necessary physical force for closing the rear door 4 is calculated as shown by a broken line B2 in FIG. 12. Although it can be seen from FIG. 12 that the situation is somewhat improved with respect to the necessary physical force in the early half stage of closing the rear door 4, the available physical force is still insufficient in an initial stage of closing the rear door 4. If there is provided an assisting device for assisting the occupant in the initial stage of closing the rear door 4 in addition to reducing the weight of the rear door 4, the necessary physical force for closing the rear door 4 is calculated as shown by a solid line B3 in FIG. 12. If the side door structure is redesigned in this fashion to reduce the physical force necessary in the initial stage of closing the rear door 4, it is possible to generally match the necessary physical force to the available physical force shown in FIG. 13 so that the occupant can close the rear door 4 without difficulty.

It is seen from FIG. 12 that the necessary physical force for closing the rear door 4 becomes negative, finally requiring a physical force in its opening direction, as the opening angle of the rear door 4 reduces. This indicates that the occupant has to close the rear door 4 while exerting a physical force on the rear door 4 in its opening direction in a final stage of closing the rear door 4 because the weight of the rear door 4 acts in its closing direction from a point where the opening angle of the rear door 4 has reached a specific value.

Figure 14:
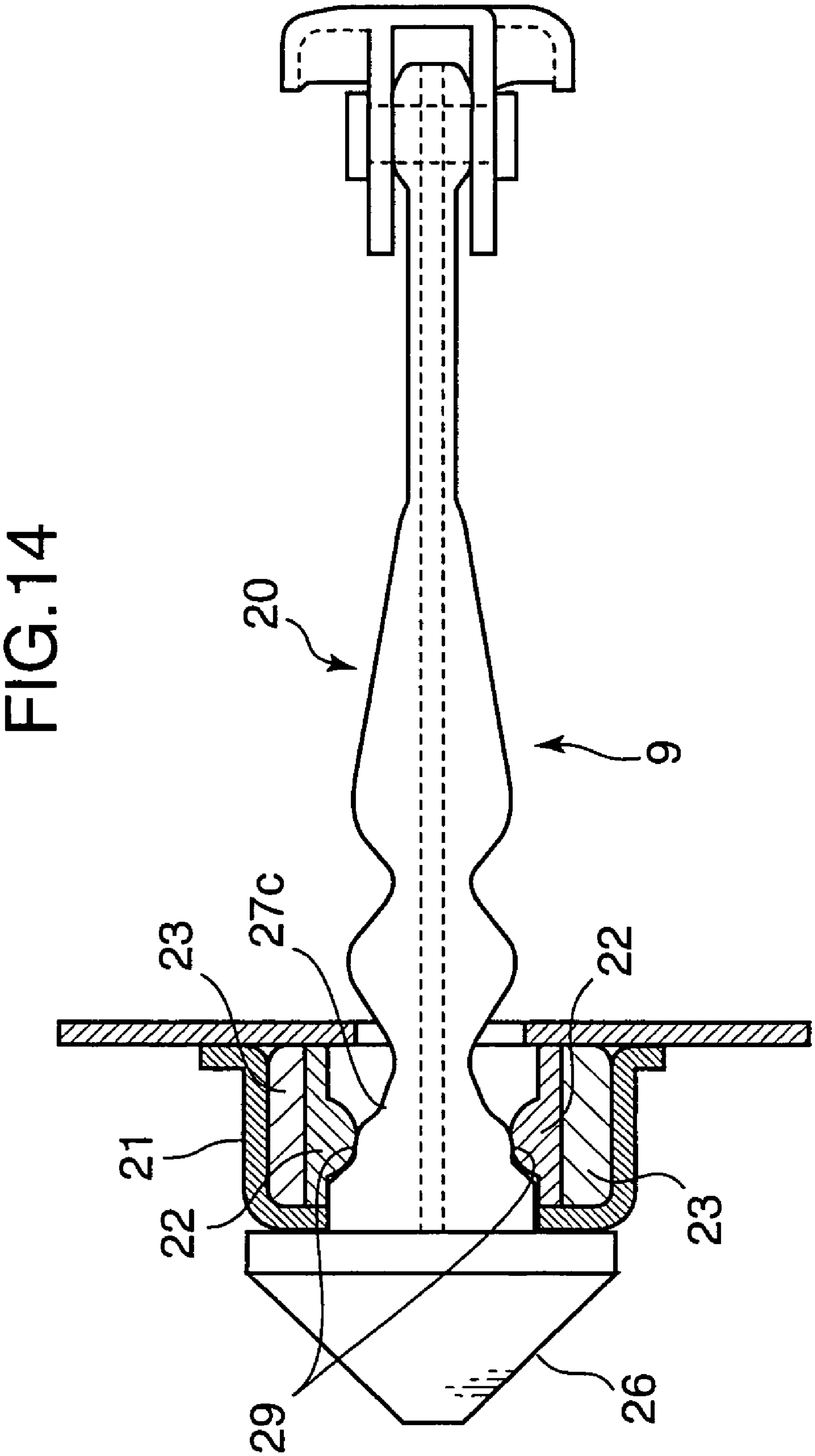
FIG. 14 is a sectional side view showing a state of the door checker for the rear door as it is opened to the maximum opening angle.

As illustrated in the foregoing discussion of the embodiment, there is formed the large-diameter portion 29 near the extreme end of the checker plate 20 of the door checker 9 for the rear door 4 and, when the rear door 4 has reached its maximum opening angle shown in FIG. 11, the clamping parts 22 contained in the holder 21 slide onto the large-diameter portion 29 of the checker plate 20 as shown in FIG. 14, whereby the door checker 9 holds the rear door 4 at the maximum opening angle. Further, there is provided the aforementioned assisting device for biasing the rear door 4 in its closing direction from the fully open position by producing a specific assisting force to assist the occupant in the initial stage of closing the rear door 4 from the fully open position. This arrangement makes it possible to easily close the rear door 4.

Figure 15:
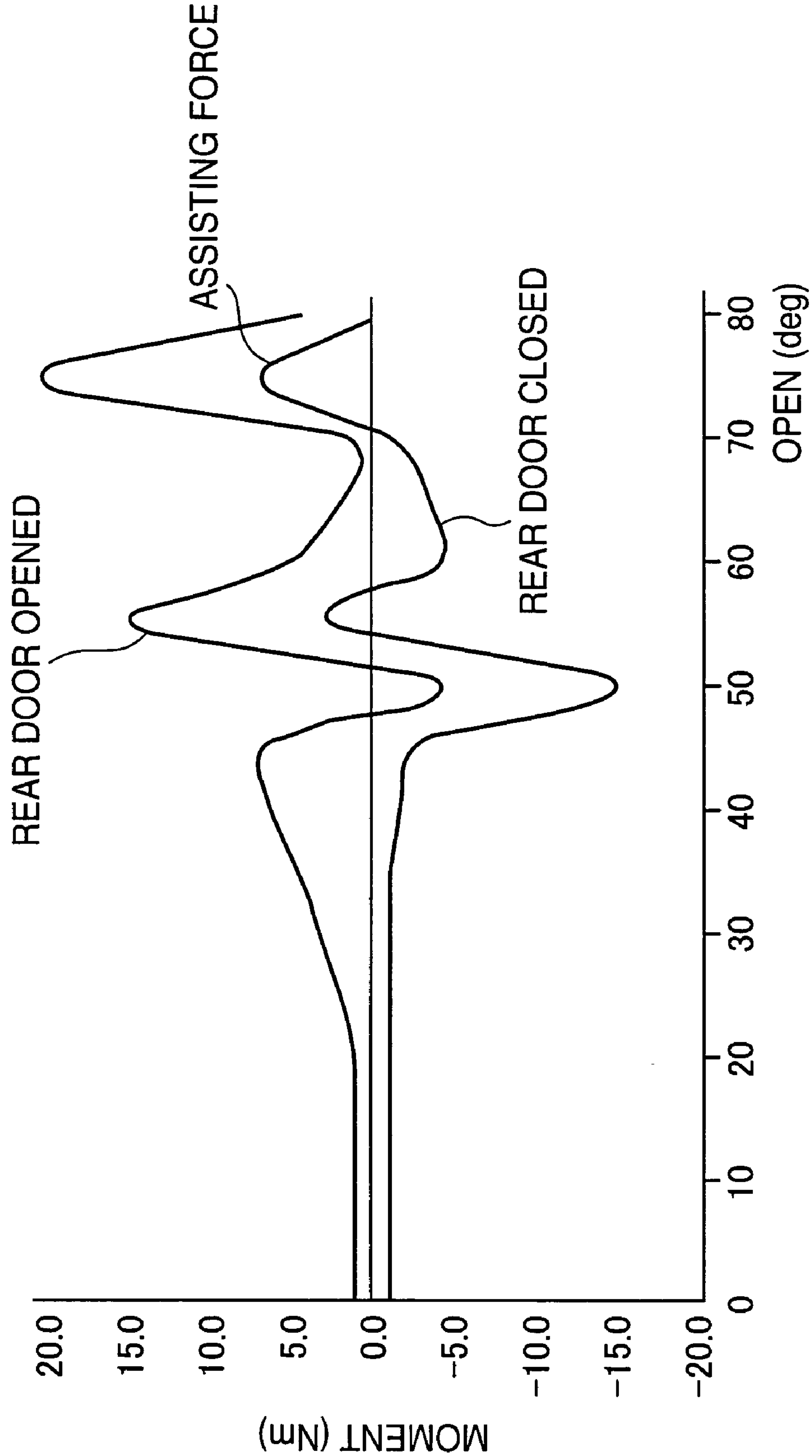
FIG. 15 is a graph showing assisting forces exerted on the rear door by its door checker.

FIG. 15 shows how moments of force exerted by the door checker 9 in the opening and closing directions of the rear door 4, which is constructed as shown in FIG. 3, vary as the rear door 4 is opened and closed. As shown in FIG. 15, the door checker 9 produces a specific assisting force in the initial stage of closing the rear door 4. This is because the elastic members 23 are compressed when the clamping parts 22 of the door checker 9 are positioned on the large-diameter portion 29 as shown in FIG. 14 so that a large amount of elastic strain energy is stored in the elastic members 23. Therefore, if the rear door 4 is moved from the maximum opening angle in its closing direction even by a small amount, the clamping parts 22 slide along sloping surfaces of the protuberances 27*c,* which widen toward the extreme end of the checker plate 20, thereby biasing the rear door 4 in the closing direction.

The aforementioned side door structure, in which the openings formed in each side wall of the vehicle body are covered by the front door 2 swingably supported by the upper and lower door hinges 1 located at the front end of the front door 2 and by the rear door 4 swingably supported by the upper and lower door hinges 3 located at the rear end of the rear door 4, is provided with the door checker 9 having the assisting device for assisting the occupant in the initial stage of closing the rear door 4. Since the assisting device assists the occupant in swinging the rear door 4 from the rearwardly opened position to the closed position, the occupant can close the rear door 4 with a small pulling force.

In this embodiment, the assisting device including biasing members for biasing the rear door 4 from its fully open position to its closed position is provided in the aforementioned door checker 9. This construction is particularly advantageous in that the rear seat occupant can close the rear door 4 from its rearwardly fully opened position relatively easily with the aid of the assisting force exerted by the assisting device, although it is generally rather difficult for reasons related to the human physical structure for the rear seat occupant to apply a large force to the rear door 4 in its closing direction when closing it by holding the inner door handle 14.

While the assisting device for biasing the rear door 4 in its closing direction is provided in the door checker 9 for the rear door 4 for retaining it at the open position in the foregoing embodiment, there may be provided an alternative form of biasing means, such as a damper, for producing a specific assisting force instead. Compared to this alternative arrangement, however, the aforementioned arrangement of the embodiment employing the biasing members provided in the door checker 9 for producing the assisting force when the rear door 4 is closed from the fully opened position to the closed position is advantageous in that the rear door 4 can be easily closed with a single structure without the need to provide a separate biasing means.

The side door structure of the present embodiment includes the door checker 9 having the checker plate 20 swingably supported at the rear end of the rear door 4 and the upper and lower clamping parts 22 for exerting the restraining force on the checker plate 20 which has the protruding part (protuberances) 27*c* widening toward the extreme end of the checker plate 20 as stated above. The door checker 9 is constructed such that the clamping parts 22 are positioned on the large-diameter portion 29 of the checker plate 20 when the rear door 4 has reached its maximum opening angle. As the clamping parts 22 slide along the protuberances 27*c* of the checker plate 20 when the occupant swings the rear door 4 from its rearwardly fully opened position to its closed position, the door checker 9 produces the aforementioned assisting force biasing the rear door 4 in its closing direction, facilitating rear door closing action of the occupant.

In this embodiment, the hinge pin 12 of each door hinge 3 affixed to the rear door 4 is inclined as viewed from the front of the vehicle so that the upper end of the hinge pin 12 is located slightly inward toward the center line of the vehicle body as shown in FIG. 3, and the hinge pin 12 of each door hinge 3 is inclined so that the upper end of the hinge pin 12 is located slightly toward the rear of the vehicle body in side view as shown in FIG. 1. This arrangement is advantageous in that the rear door 4 can be opened with a small force while avoiding interference between the front end of the rear door 4 and the rear end of the front door 2 and held at an open position of a specific opening angle by means of the door checker 9 which exerts a small restraining force on the rear door 4.

Figure 16:
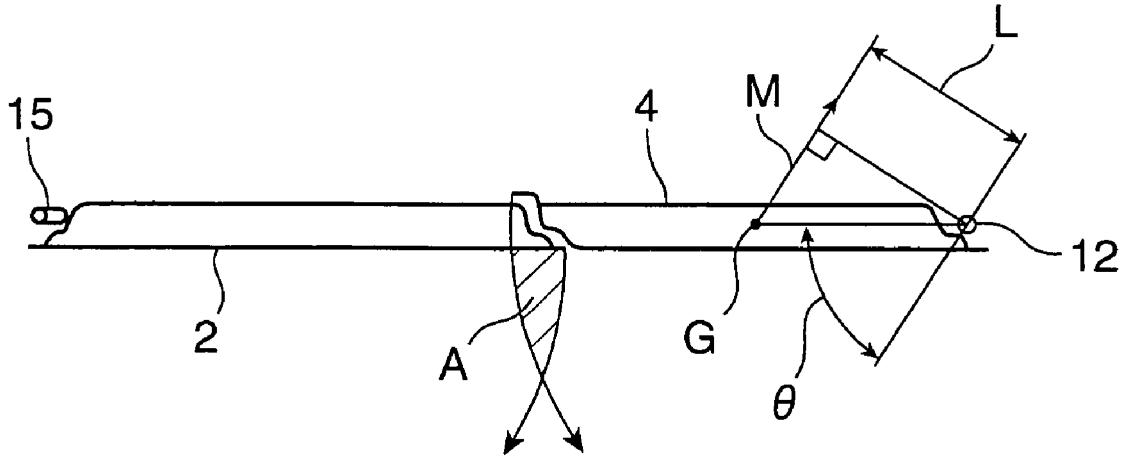
FIG. 16 is an explanatory diagram showing how the front door and the rear door swing when opened and closed.
Figure 20:
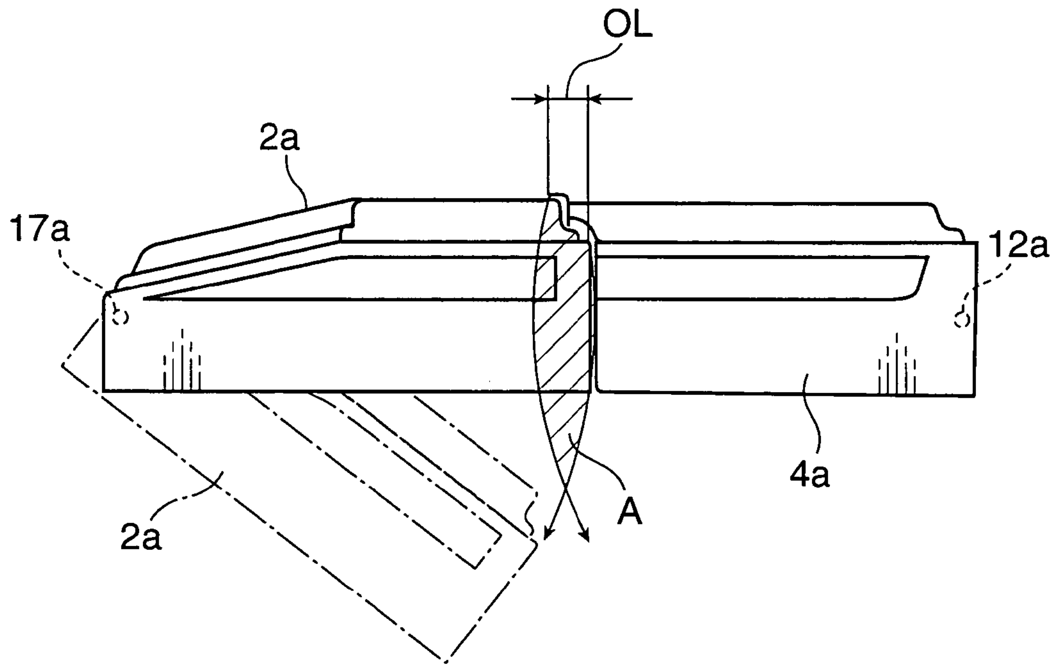
FIG. 20 is an explanatory diagram showing an example of a conventional side door structure of a vehicle.

Since the hinge pin 12 of each door hinge 3 of the rear door 4 is inclined such that the upper end of the hinge pin 12 is located slightly inward toward the center line of the vehicle body as stated above, it is possible to prevent an upper portion of the rear door 4 from being located on the inside of the hinge pin 12. Also, when swinging the rear door 4 from the closed position to the open position about the hinge pins 12, it is possible to prevent the front end of the rear door 4 from shifting frontward too much. Compared to the earlier-mentioned example of the conventional side door structure shown in FIG. 20, in which the hinge pins 12*a* are mounted in a vertical position as viewed from the side of the vehicle, it is possible to significantly decrease an area "A" of overlap between the rear end of the front door 2 and the front end of the rear door 4 as viewed along an axial direction of the hinge pins 12 which are inclined as stated above, as shown in FIG. 16. This arrangement effectively prevents interference between the front door 2 and the rear door 4.

Figure 21:
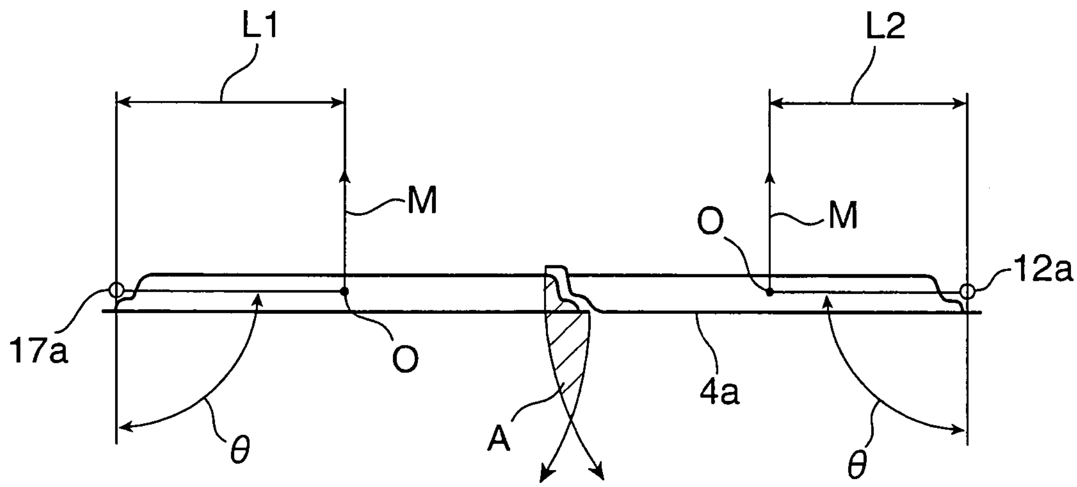
FIG. 21 is an explanatory diagram showing another example of a conventional side door structure of a vehicle.

Also, since the hinge pin 12 of each door hinge 3 of the rear door 4 is inclined so that the upper end of the hinge pin 12 is located slightly toward the rear of the vehicle body in side view, it is possible to reduce the length L of an arm of moment acting on the rear door 4 in its closing direction about the axis line 120 of the hinge pins 12 passing through the center of gravity G of the rear door 4 due to its own weight M, compared to the conventional side door structure shown in FIG. 21. This makes it possible to effectively reduce a swinging force needed in an initial stage of opening the rear door 4. Moreover, since the moment acting on the rear door 4 in its closing direction becomes zero at a point where the rear door 4 is opened to a specific angle θ which is smaller than 90 degrees and an acting direction of the weight M of the rear door 4 matches a direction of inclination of the hinge pin 12 of each door hinge 3 as shown in FIG. 16, it is also possible to effectively reduce a swinging force needed in a final stage of opening the rear door 4. While the own weight M of the rear door 4 acts in a vertical direction through its center of gravity,G, a line showing the direction in which the weight M of the rear door 4 acts is inclined as illustrated in FIG. 16. This is because FIG. 16 shows the side door structure as viewed along the axial direction of the hinge pins 12, that is, as if cut by a plane intersecting the axis line 120 of the hinge pins 12 at right angles thereto.

When the door checker 9 is located more inward toward the center line of the vehicle body than the hinge pins 12 which are inclined such that their upper ends are located slightly inward toward the center line of the vehicle body as shown in FIG. 3, the axis line 120 of the hinge pins 12 is offset so much from the location of the door checker 9 that a sufficient distance S can be ensured between the locations of the hinge pins 12 and the location of the door checker 9 as viewed along the axis line 120. It is therefore possible to obtain a large resisting moment which is given as the product of the restraining force exerted by the door checker 9 when the rear door 4 is opened or closed and the aforementioned distance S. Consequently, the door checker 9 can hold the rear door 4 at specific opening angles in a stable fashion even when the restraining force exerted by the door checker 9 is small.

When the aforementioned structure is employed for effectively reducing the swinging force needed in the initial stage of opening the rear door 4 from its fully open position, a specific moment of force corresponding to the weight M of the rear door 4 acts in its closing direction. Although this moment of force caused by the weight M of the rear door 4 impedes the occupant's rear door closing action, the provision of the aforementioned assisting device (biasing members) in the door checker 9 for biasing the rear door 4 in the closing direction from its fully open position enables the occupant to easily close the rear door 4 from its fully open position.

Figure 17:
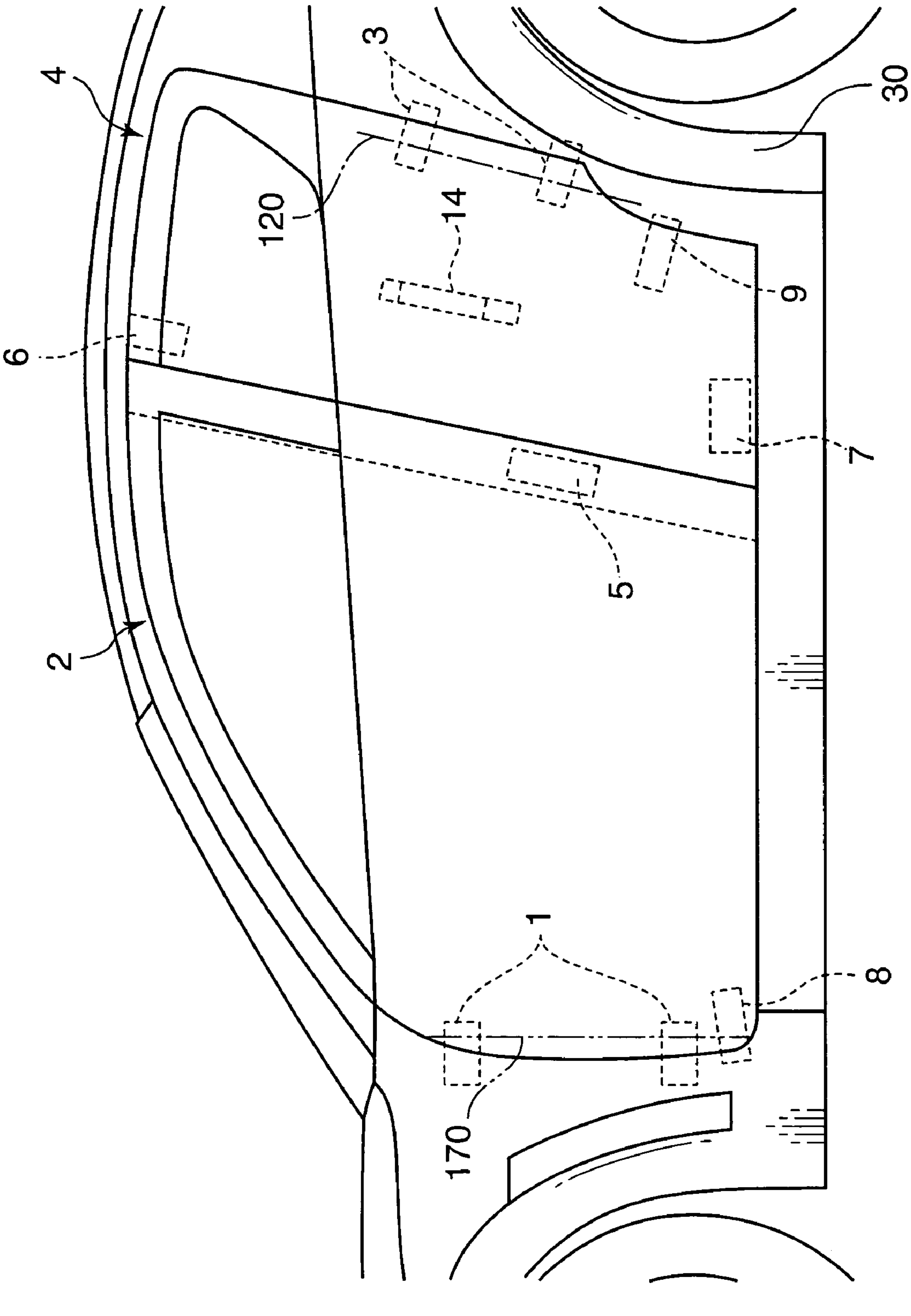
FIG. 17 is a side view particularly showing an alternative rear door structure in one varied form of the embodiment.

FIG. 17 is a side view showing an alternative side door structure in one varied form of the foregoing embodiment. This variation of the embodiment, applied to a vehicle in which rear doors 4 are located at the front of wheel arches (curved exterior portions of left and right tire houses) 30 for rear wheels, is constructed such that a door checker 9 for each rear door 4 is located at a position offset frontward from the locations of hinge pins 12 of door hinges 3. This structure is advantageous in that the door checker 9 can be installed at a proper position and effectively produce a specific resisting moment during the opening of the rear door 4 while avoiding interference between the wheel arch 30 and the door checker 9.

According to the embodiment, the inner door handle 14 used for opening and closing the rear door 4 is located a specific distance W toward the rear of the vehicle body from the front end of the rear door 4. This arrangement is advantageous for the rear seat occupant when closing the rear door 4 from its maximum open position shown in FIG. 11. Specifically, the rear seat occupant can easily swing the rear door 4 from the open position to the closed position while holding the inner door handle 14 in a natural posture without the need to stretch the arm for gripping the inner door handle 14.

As will be recognized from the foregoing discussion, the method of the invention for designing the side door structure of the vehicle includes a necessary physical force calculating process for calculating the physical forces expected to be necessary for opening and closing the individual doors 2, 4 based on their mechanical characteristics data obtained in the predesign stage, an available physical force calculating process for calculating physical forces that a vehicle occupant can exert when opening and closing the individual doors 2, 4, an analyzing process for analyzing mechanical characteristics of the individual doors 2, 4 needed for reducing differences between the necessary physical forces and the available physical forces should any differences exist therebetween, and a redesign process for redesigning the individual doors 2, 4, if necessary, based on the result of analysis.

If this design method of the invention is applied to the designing of the side door structure of the vehicle of which side openings are covered by the front doors 2 swingably supported by the door hinges 1 located at the front of the front doors 2 and by the rear doors 4 swingably supported by the door hinges 3 located at the rear of the rear doors 4, it is possible to design with ease and high accuracy the construction of the front and rear doors 2, 4 which can be properly opened and closed by analyzing the differences between the necessary physical forces of the doors 2, 4 obtained from such mechanical characteristics as their weights and hinge locations and the available physical forces determined by physical properties of a typical vehicle occupant.

If assisting forces exerted by assisting devices for assisting the occupant in closing the front and rear doors 2, 4 are used as essential part of the mechanical characteristics of the front and rear doors 2, 4 for reducing the differences between the necessary physical forces of the individual doors 2, 4 and the available physical forces, it is possible to design with ease and high accuracy the construction of the front and rear doors 2, 4 which enables the occupant to properly close the individual doors 2, 4 from their open positions with the assisting forces exerted by the assisting devices.

In particular, if the assisting force exerted by the assisting device including the biasing members for biasing the rear door 4 from its fully open position to its closed position is used as essential part of the mechanical characteristics of the rear door 4 for reducing the difference between the necessary physical force of the rear door 4 and the available physical force, it is possible to design with ease and high accuracy the construction of the rear door 4 which enables the rear seat occupant to properly close the rear door 4 from the fully open position with the aid of the assisting force exerted by the assisting device.

Further, if the assisting force exerted by the biasing members provided in the door checker 9 for maintaining the rear door 4 at a fixed position when it has reached a specific opening angle is used as essential part of the mechanical characteristics of the rear door 4 for reducing the difference between the necessary physical force of the rear door 4 and the available physical force, it is possible to design with high accuracy the construction of the rear door 4 which enables the rear seat occupant to properly close the rear door 4 with ease from the fully open position with the aid of the assisting force exerted by the biasing members provided in the door checker 9.

According to the side door structure of the foregoing embodiment, in which the openings formed in each side wall of the vehicle body are covered by the front door 2 swingably supported by the upper and lower door hinges 1 located at the front end of the front door 2 and by the rear door 4 swingably supported by the upper and lower door hinges 3 located at the rear end of the rear door 4, the door checker 8 holds the front door 2 at a first front door hold position corresponding to the minimum opening angle $\theta 1$ at a point in time when the upper and lower clamping parts 22 have reached the first recesses 28*a* formed on the checker plate 20 of the door checker 8 closest to the support pin 19. Since the open position of the front door 2 at this minimum opening angle θ1 is located on the outside of but close to the swing trajectory α of the front end of the rear door 4 as shown in FIG. 8, it is possible to effectively prevent the front end of the rear door 4 from interfering with the rear end of the front door 2 when opening the rear door 4 after slightly opening the front door 2.

A second front door hold position where the door checker 8 holds the front door 2 at a point in time when the clamping parts 22 have reached the location of the second recesses 28*b* at about the middle of the length of the checker plate 20 is located at a position corresponding to the medium opening angle θ2 convenient for the front seat occupant to get into and out of the vehicle, and a third front door hold position where the door checker 8 holds the front door 2 at a point in time when the clamping parts 22 have reached the location of the third recesses 28*c* near the extreme end of the checker plate 20 is located at a position corresponding to the maximum opening angle θ3. This arrangement is advantageous in that the front seat occupant can easily get into and out of the vehicle with the front door 2 held at the medium opening angle θ2 and luggage can be easily loaded into and unloaded from the vehicle interior with the front door 2 held at the maximum opening angle θ3.

In the aforementioned embodiment of the invention, the position of the minimum opening angle at which the door checker 9 holds the rear door 4 at a point in time when the clamping parts 22 have reached the location of the first recesses 28*a* formed on the checker plate 20 of the door checker 9 closest to the support pin 19 is located slightly on the outside of the swing trajectory β of the rear end of the front door 2. This arrangement is advantageous in that it effectively prevents the front door 2 from interfering with the rear door 4 when the occupant opens and closes the front door 2 with the rear door 4 held at its minimum opening angle.

According to the embodiment, a rear door hold position where the door checker 9 holds the rear door 4 at a point in time when the clamping parts 22 have reached the location of the second recesses 28*b* formed on the checker plate 20 is located at a position corresponding to the medium opening angle convenient for the rear seat occupant to get into and out of the vehicle. This arrangement permits the rear seat occupant to easily get into and out of the vehicle with the rear door 4 held at the medium opening angle. In addition, a rear door hold position where the door checker 9 holds the rear door 4 at a point in time when the clamping parts 22 have reached the location of the large-diameter portion 29 formed near the extreme end of the checker plate 20 is located at a position corresponding to the maximum opening angle of the rear door 4. This is advantageous in that luggage can be easily loaded into and unloaded from the vehicle interior with the rear door 4 opened up to the maximum opening angle.

In the foregoing embodiment, the hinge pins 17 of the door hinges 1 are inclined sideways as viewed from the front of the vehicle so that their upper ends are located slightly inward toward the center line of the vehicle body. This arrangement is advantageous in that it is possible to prevent the rear end of the front door 2 from shifting rearward too much when the vehicle occupant opens the front door 2 about the hinge pins 17, thereby avoiding interference between the rear end of the front door 2 and the front end of the rear door 4 more effectively.

Figure 18:
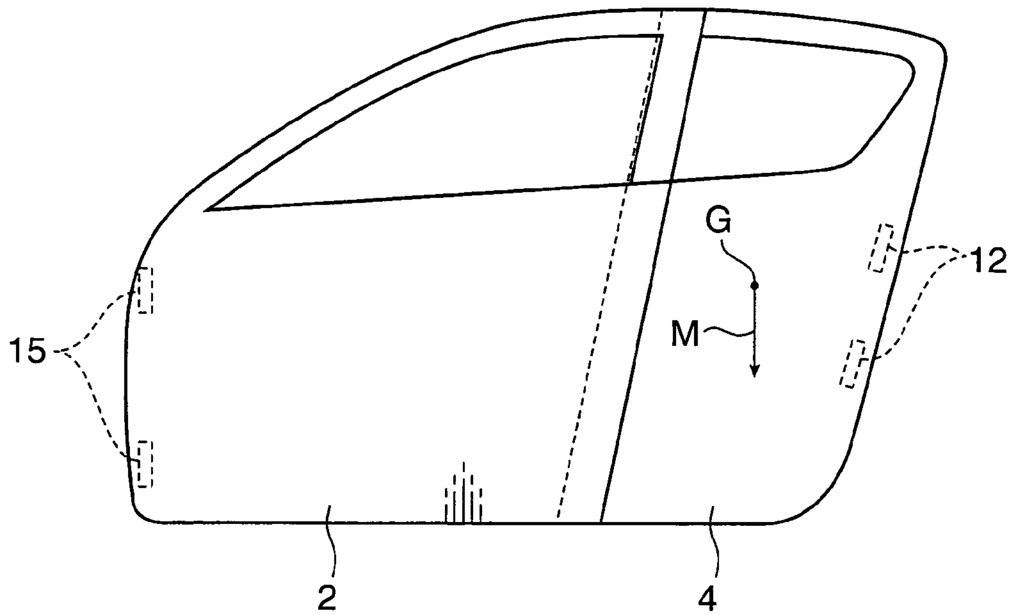
FIG. 18 is an explanatory side view of the front door and the rear door.
Figure 19:
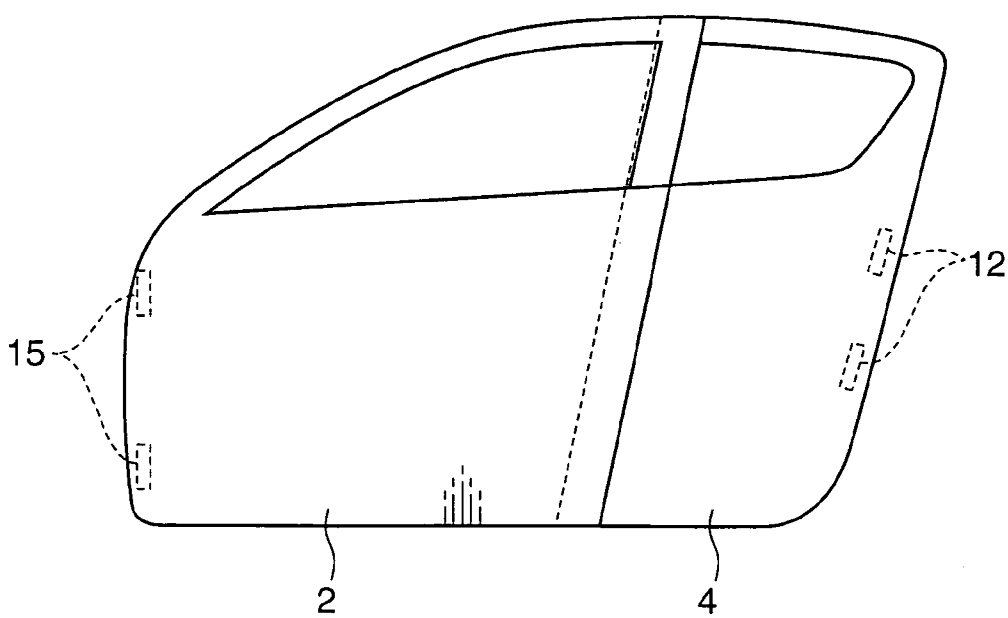
FIG. 19 is a side view of a side door structure in one varied form of the embodiment of the invention.

In the side door structure of the foregoing embodiment, the hinge pins 17 of the door hinges 1 supporting the front door 2 are inclined such that the upper end of each hinge pin 17 is located slightly inward toward the center line of the vehicle body as viewed from its front and the axis line 170 of each hinge pin 17 is oriented generally vertically in side view as shown in FIG. 18. As an alternative, the hinge pins 17 of the door hinges 1 may be inclined such that the upper end of each hinge pin 17 is located slightly frontward in side view as illustrated in FIG. 19. This varied form of the side door structure is advantageous in that it effectively reduces a swinging force needed in opening the front door 2 about the hinge pins 17 as is the case with the rear door 4.

In the foregoing embodiment, the door checker 9 for the rear door 4 is located below the upper and lower door hinges 3 mounted at the rear end the rear door 4. This arrangement makes it possible to install the door checker 9 with a sufficiently large degree of freedom in its location by efficiently using a space available below the door hinges 3. Also, the checker plate 20 having an increased overall length, and thus having a large moving stroke, can be installed in the aforementioned space below the door hinges 3 of the rear door 4. This is advantageous in that the maximum opening angle of the rear door 4 restricted by the door checker 9 can be increased.

Also, there are formed the multiple recesses 28*a*, 28*b*, 28*c* on the checker plate 20 of the door checker 8 for the front door 2 and the multiple recesses 28*a*, 28*b* on the checker plate 20 of the door checker 9 for the rear door 4. This is advantageous in that the front and rear doors 2, 4 can be held at multiple door hold positions of specific door opening angles corresponding to the locations of the recesses 28*a*, 28*b*, 28*c* (or the recesses 28*a*, 28*b*) on the checker plate 20, thereby enabling the individual occupants to easily get into and get out of the vehicle.

More specifically, the door checker 8 for the front door 2 is constructed such that, when the opening angle of the front door 2 becomes equal to the aforementioned minimum opening angle θ1 at which the front door 2 is located slightly on the outside of the swing trajectory α of the front end of the rear door 4, the clamping parts 22 of the door checker 8 reach the location of the first recesses 28*a* (among the first to third recesses 28*a*, 28*b*, 28*c*) formed on the checker plate 20 of the door checker 8 closest to the support pin 19, whereby the front door 2 is held at the minimum opening angle θ1 as shown in FIG. 8. The opening angle of the front door 2 corresponding to the location of the second recesses 28*b* situated at about the middle of the length of the checker plate 20 is set at the aforementioned medium opening angle θ2 which is convenient for the front seat occupant to get into and out of the vehicle. Further, the opening angle of the front door 2 corresponding to the location of the third recesses 28*c* situated near the extreme end of the checker plate 20 is set at the aforementioned maximum opening angle θ3.

As the door checker 8 holds the front door 2 at the position corresponding to the minimum opening angle θ1 when the occupant slightly opens the front door 2 before opening the rear door 4, the occupant can easily open the rear door 4 without causing interference between the front and rear doors 2, 4. When the front door 2 is further opened up to a point where the clamping parts 22 fit into the second recesses 28*b*, the door checker 8 holds the front door 2 at the medium opening angle θ2, enabling the front seat occupant to easily get into and out of the vehicle. When the front door 2 is further opened up to a point where the clamping parts 22 fit into the third recesses 28*c*, the door checker 8 holds the front door 2 at the maximum opening angle θ3, making it easy to load and unload luggage into and from the vehicle interior.

As illustrated in the foregoing discussion of the embodiment, there is formed the large-diameter portion 29 near the extreme end of the checker plate 20 of the door checker 9 for the rear door 4 and, when the opening angle of the rear door 4 has reached its maximum opening angle shown in FIG. 11, the clamping parts 22 contained in the holder 21 slide onto the large-diameter portion 29 of the checker plate 20 as shown in FIG. 14, whereby and the door checker 9 holds the rear door 4 at the maximum opening angle. This arrangement is advantageous in that the occupant can easily close the rear door 4 from its maximum opening angle.

More specifically, when the clamping parts 22 of the door checker 9 are positioned on the large-diameter portion 29 as shown in FIG. 14, the elastic members 23 are compressed so much that a large amount of elastic strain energy is stored in the elastic members 23. Therefore, if the rear door 4 is moved from the maximum opening angle in its closing direction even by a small amount, the clamping parts 22 slide along the sloping surfaces of the protuberances 27*c*, which widen toward the extreme end of the checker plate 20, thereby producing a large assisting force biasing the rear door 4 in the closing direction. Therefore, the rear seat occupant can close the rear door 4 from its maximum opening angle shown in FIG. 11 relatively easily, although it is generally rather difficult for reasons related to the human physical structure for the rear seat occupant to apply a large force to the rear door 4 in its closing direction when closing it from the maximum opening angle by holding the inner door handle 14.

In the side door structure of the present embodiment, in which the openings formed in each side wall of the vehicle body are covered by the front door 2 swingably supported by the upper and lower door hinges 1 located at the front end of the front door 2 and by the rear door 4 swingably supported by the upper and lower door hinges 3 located at the rear end of the rear door 4, the door checker 9 is located below the upper and lower door hinges 3 of the rear door 4. This arrangement makes it possible to install the door checker 9 at a proper position with a large degree of freedom in its location.

If the door checker 9 is installed between the upper and lower door hinges 3 located at the rear end of the rear door 4 as shown in Japanese Laid-open Patent Publication No. 1998-331502, the degree of freedom in the location of the door checker 9 is significantly reduced due to limited space available between the upper and lower door hinges 3. By comparison, a sufficient space is available below the door hinges 3, and the door checker 9 can be installed with a large degree of freedom in its location through efficient use of this space. As the checker plate 20 having an increased overall length, and thus having a large moving stroke, can be installed in the space in a lower part of the rear door 4, the maximum opening angle of the rear door 4 restricted by the door checker 9 can be increased.

In summary, in one form of the invention, a side door structure of a vehicle of which side openings are covered by a front door and a rear door includes a door hinge located at a front end of the front door for swingably supporting the front door and a door hinge located at a rear end of the rear door for swingably supporting the rear door. In this side door structure, the door hinge for the rear door includes a hinge pin which is inclined such that its upper end is located inward toward a center line of a vehicle body as viewed from the front of the vehicle and toward the rear of the vehicle body as viewed from the side of the vehicle.

Since the hinge pin of the door hinge for the rear door is inclined such that its upper end is located inward toward the center line of the vehicle body in this side door structure, the amount of frontward shift of the front end of the rear door occurring when the rear door is opened is reduced. This helps prevent interference between the front and rear doors. In addition, a swinging force needed in opening the rear door about the hinge pin is reduced as the hinge pin is inclined such that its upper end is located toward the rear of the vehicle body in this side door structure. Also, since the hinge pin of the door hinge for the rear door is inclined as stated above, it is possible to open and close the rear door with increased operational ease while effectively avoiding interference between the front and rear side doors in this two-way opening side door structure.

According to the invention, the aforementioned side door structure may be built in such a manner that the door hinge for the front door includes a hinge pin which is inclined such that its upper end is located inward toward the center line of the vehicle body as viewed from the front of the vehicle and toward the front of the vehicle body as viewed from the side of the vehicle.

Since the hinge pin of the door hinge for the front door is inclined such that its upper end is located inward toward the center line of the vehicle body in this side door structure, the amount of rearward shift of the rear end of the front door occurring when the front door is opened is reduced. This helps prevent interference between the front and rear doors more effectively. In addition, a swinging force needed in opening the front door about the hinge pin is reduced as the hinge pin is inclined such that its upper end is located toward the front of the vehicle body in this side door structure.

In another form of the invention, a side door structure of a vehicle of which side openings are covered by a front door and a rear door includes a door hinge located at a front end of the front door for swingably supporting the front door and a door hinge located at a rear end of the rear door for swingably supporting the rear door. In this side door structure, the door hinge for the front door includes a hinge pin which is inclined such that its upper end is located inward toward a center line of a vehicle body as viewed from the front of the vehicle and toward the front of the vehicle body as viewed from the side of the vehicle.

Since the hinge pin of the door hinge for the front door is inclined such that its upper end is located inward toward the center line of the vehicle body in this side door structure, the amount of rearward shift of the rear end of the front door occurring when the front door is opened is reduced. This helps prevent interference between the front and rear doors. In addition, a swinging force needed in opening the front door about the hinge pin is reduced as the hinge pin is inclined such that its upper end is located toward the front of the vehicle body in this side door structure. Also, since the hinge pin of the door hinge for the front door is inclined as stated above, it is possible to open and close the front door with increased operational ease while effectively avoiding interference between the front and rear side doors in this two-way opening side door structure.

In still another form of the invention, a side door structure of a vehicle of which side openings are covered by a front door and a rear door includes a pair of upper and lower door hinges located at a front end of the front door for swingably supporting the front door, a pair of upper and lower door hinges located at a rear end of the rear door for swingably supporting the rear door, and a door checker located beneath the door hinges supporting the rear door.

In this side door structure, the door checker is installed by efficiently using a space available at a lower part of the rear door. The rear door can be held at predefined specific opening angles by the door checker. Also, the door checker can be installed at a proper position with a large degree of freedom in component layout.

According to the invention, this side door structure may be built in such a manner that each of the door hinges for the rear door includes a hinge pin which is inclined such that its upper end is located inward toward a center line of a vehicle body as viewed from the front of the vehicle and toward the rear of the vehicle body as viewed from the side of the vehicle.

Since the hinge pin of each door hinge for the rear door is inclined such that its upper end is located inward toward the center line of the vehicle body in this side door structure, the amount of frontward shift of the front end of the rear door occurring when the rear door is opened is reduced. This helps prevent interference between the front and rear doors. In addition, a swinging force needed in opening the rear door about the hinge pins is reduced as the hinge pin of each door hinge for the rear door is inclined such that its upper end is located toward the rear of the vehicle body in this side door structure.

In addition, this side door structure may be built in such a manner that the door checker is located at a position offset inward toward the center line of the vehicle body by a specific distance from the location of the hinge pin of each door hinge for the rear door.

Since the hinge pin of each door hinge for the rear door is inclined such that its upper end is located inward toward the center line of the vehicle body in this side door structure, a sufficient distance is ensured between an axis line of the hinge pins of the rear door and the door checker. Therefore, the door checker exerts a large resisting moment on the rear door as it is opened and closed.

Also, this side door structure may be built in such a manner that the rear door is located at the front of a wheel arch for a rear wheel and the door checker is located at a position offset toward the front of the vehicle body from the location of the hinge pins of the door hinges for the rear door.

This side door structure helps prevent interference between the wheel arch located at the rear of the rear door and the door checker. Also, the door checker can be installed at a proper position and effectively exerts a specific resisting moment on the rear door as it is opened.

In yet another form of the invention, a side door structure of a vehicle of which side openings are covered by a front door and a rear door includes a door hinge located at a front end of the front door for swingably supporting the front door, a door hinge located at a rear end of the rear door for swingably supporting the rear door, and an assisting device for assisting a vehicle occupant in closing the rear door.

Since the assisting device assists the vehicle occupant in swinging the rear door from its rearwardly opened position to its closed position in this side door structure, the occupant can close the rear door with a small pulling force.

It would be possible in this side door structure, as well, to incline the hinge pin of the door hinge for the rear door such that its upper end is located toward the rear of the vehicle body so that the rear door can be opened with a small swinging force and held at a fully open position in a stable fashion. This arrangement could develop a problem that it becomes difficult for a rear seat occupant to swing the rear door from its open position to its closed position, tough. In this side door structure of the invention, however, it is possible to close the rear door with a small pulling force even when the hinge pin of the door hinge for the rear door is inclined such that its upper end is located toward the rear of the vehicle body, because there is provided the aforementioned assisting device.

According to the invention, this side door structure may be built in such a manner that the assisting device includes a biasing member for biasing the rear door in its closing direction from a position of its maximum opening angle.

Since the biasing member assists the vehicle occupant in swinging the rear door from its rearwardly opened position to its closed position in this side door structure, the occupant can close the rear door with a small pulling force.

This side door structure may further includes a door checker for holding the rear door at its open position, the aforementioned biasing member for biasing the rear door in its closing direction constituting part of the door checker for the rear door.

Since the biasing member provided in the door checker assists the vehicle occupant in swinging the rear door held at its rearwardly opened position by the door checker to the closed position in this side door structure, the occupant can close the rear door with a small pulling force.

According to the invention, this side door structure may be built in such a manner that the door checker for the rear door includes a checker plate swingably supported at the rear end of the rear door, and a clamp which exerts a restraining force on the checker plate when compressed thereby, wherein a protruding part widening toward its end is formed at an extreme end of the checker plate, forming a large-diameter portion thereon, and the clamp is positioned on the large-diameter portion of the protruding part when the rear door has reached its maximum opening angle.

In this side door structure, the clamp slides along the protruding part formed on the checker plate of the door checker when the vehicle occupant swings the rear door held at its rearwardly opened position by the door checker to the closed position. Since sliding motion of the clamp along the protruding part of the checker plate assists the vehicle occupant in closing the rear door, the occupant can close the rear door with a small pulling force.

According to the invention, the aforementioned side door structure may be built in such a manner that the door hinge for the rear door includes a hinge pin which is inclined such that its upper end is located inward toward a center line of a vehicle body as viewed from the front of the vehicle and toward the rear of the vehicle body as viewed from the side of the vehicle.

Since the hinge pin of the door hinge for the rear door is inclined such that its upper end is located inward toward the center line of the vehicle body in this side door structure, the amount of frontward shift of the front end of the rear door occurring when the rear door is opened is reduced. This helps prevent interference between the front and rear doors. In addition, a swinging force needed in opening the rear door about the hinge pin is reduced as the hinge pin is inclined such that its upper end is located toward the rear of the vehicle body in this side door structure.

The aforementioned side door structure may further include an inner door handle mounted on an inside surface of the rear door, the inner door handle being located a specific distance rearward from the front end of the rear door.

This side door structure enables the rear seat occupant to easily swing the rear door from its open position to its closed position while holding the inner door handle provided on the inside surface of the rear door.

According to the invention, a method of designing a side door structure is applied to a vehicle of which side openings are covered by a front door swingably supported by a door hinge located at a front end of the front door and by a rear door swingably supported by a door hinge located at a rear end of the rear door. This design method includes a necessary physical force calculating process for calculating a necessary physical force expected to be necessary for opening and closing each of the front and rear doors based on their mechanical characteristics data obtained in a predesign stage of the individual doors, an available physical force calculating process for calculating an available physical force which a rear seat occupant can exert when opening and closing each of the front and rear doors, an analyzing process for analyzing mechanical characteristics of each of the front and rear doors needed for reducing a difference between the necessary physical force and the available physical force should any difference exists therebetween, and a redesign process for redesigning the individual doors, if necessary, based on the result of analysis.

This design method makes it possible to design with ease and high accuracy the construction of the rear door which can be properly opened and closed by analyzing the difference between the necessary physical force obtained from such mechanical characteristics as its weight and hinge location and the available physical force determined by physical properties of a typical vehicle occupant.

In one feature of the invention, the aforementioned design method uses an assisting force exerted by an assisting device for assisting a vehicle occupant in closing each of the front and rear doors as part of the mechanical characteristics needed for reducing the difference between the necessary physical force and the available physical force.

According to this design method, it is possible to design with ease and high accuracy the construction of the doors which enables the occupant to properly close each door from its open position with the assisting force exerted by the assisting device.

In another feature of the invention, the assisting force exerted by the assisting device used as part of the mechanical characteristics needed for reducing the difference between the necessary physical force and the available physical force is a biasing force exerted by a biasing member for biasing each door in its closing direction from a position of its maximum opening angle.

According to this design method, it is possible to design with ease and high accuracy the construction of the doors which enables the occupant to properly close each door from its open position with the biasing force exerted by the biasing device.

In still another feature of the invention, the biasing member for exerting the biasing force which is used as part of the mechanical characteristics needed for reducing the difference between the necessary physical force and the available physical force constitutes part of a door checker for maintaining each door at a fixed position when it has reached a specific opening angle.

According to this design method, it is possible to design with ease and high accuracy the construction of the doors which enables the occupant to properly swing each door held at its fully open position by the door checker to the closed position with the biasing force exerted by the biasing device provided in the door checker.

This application is based on Japanese patent application serial nos. 2002-321631, 2002-321655, and 2002-324231, filed in Japan Patent Office on Nov. 5, 2002, Nov. 5, 2002, and Nov. 7, 2002, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A side door structure of a vehicle of which side openings are covered by a front door and a rear door, said side door structure comprising:

a door hinge located at a front end of the front door for swingably supporting the front door; and a door hinge located at a rear end of the rear door for swingably supporting the rear door, the door hinge for the rear door including a hinge pin which is inclined such that its upper end is located inward toward a center line of a vehicle body as viewed from the front of the vehicle and toward the rear of the vehicle body as viewed from the side of the vehicle.

2. The side door structure according to claim 1, the door hinge for the front door including a hinge pin which is inclined such that its upper end is located inward toward the center line of the vehicle body as viewed from the front of the vehicle and toward the front of the vehicle body as viewed from the side of the vehicle.

3. A side door structure of a vehicle of which side openings are covered by a front door and a rear door, said side door structure comprising:

a door hinge located at a front end of the front door for swingably supporting the front door, the door hinge for the front door including a hinge pin which is inclined such that its upper end is located inward toward a center line of a vehicle body as viewed from the front of the vehicle and toward the front of the vehicle body as viewed from the side of the vehicle; and a door hinge located at a rear end of the rear door for swingably supporting the rear door.

4. A side door structure of a vehicle of which side openings are covered by a front door and a rear door, said side door structure comprising:

a pair of upper and lower door hinges located at a front end of the front door for swingably supporting the front door;

a pair of upper and lower door hinges located at a rear end of the rear door for swingably supporting the rear door; and a door checker located beneath the door hinges supporting the rear door, wherein said door hinge for the rear door including a hinge pin which is inclined such that its upper end is located inward toward a center line of a vehicle body as viewed from the front of the vehicle and toward the rear to the vehicle body as viewed from the side of the vehicle.

5. The side door structure according to claim 4, wherein each of the door hinges for the rear door includes a hinge pin which is inclined such that its upper end is located inward toward a center line of a vehicle body as viewed from the front of the vehicle and toward the rear of the vehicle body as viewed from the side of the vehicle.

6. The side door structure according to claim 5, wherein the door checker is located at a position offset inward toward the center line of the vehicle body by a specific distance from the location of the hinge pin of each door hinge for the rear door.

7. The side door structure according to claim 4, wherein the rear door is located at the front of a wheel arch for a rear wheel and the door checker is located at a position offset toward the front of the vehicle body from the location of the hinge pins of the door hinges for the rear door.

8. A side door structure of a vehicle of which side openings are covered by a front door and a rear door, said side door structure comprising:

a pair of upper and lower door hinges located at a front end of the front door for swingably supporting the front door;

a pair of upper and lower door hinges located at a rear end of the rear door for swingably supporting the rear door; and a door checker located beneath the door hinges supporting the rear door, wherein said door binge for the front door including a hinge pin which is inclined such that its upper end is located inward toward a center line of a vehicle body as viewed from the front of the vehicle and toward the front of the vehicle body as viewed from the side of the vehicle.

9. The side door structure according to claim 8, wherein each of the door hinges for the rear door includes a hinge pin which is inclined such that its upper end is located inward toward a center line of a vehicle body as viewed from the front of the vehicle and toward the rear of the vehicle body as viewed from the side of the vehicle.

10. The side door structure according to claim 9, wherein the door checker is located at a position offset inward toward the center line of the vehicle body by a specific distance from the location of the hinge pin of each door hinge for the rear door.

11. The side door structure according to claim 8, wherein the rear door is located at the front of a wheel arch for a rear wheel and the door checker is located at a position offset toward the front of the vehicle body from the location of the hinge pins of the door hinges for the rear door.

* * * * *